(12) United States Patent
Lou et al.

(10) Patent No.: US 11,503,613 B2
(45) Date of Patent: Nov. 15, 2022

(54) INTERFERENCE DISCOVERY AND CANCELLATION FOR WLAN WITH FULL DUPLEX RADIOS

(71) Applicant: INTERDIGITAL PATENT HOLDINGS, INC., Wilmington, DE (US)

(72) Inventors: Hanqing Lou, Syosset, NY (US); Alphan Sahin, Westbury, NY (US); Oghenekome Oteri, San Diego, CA (US); Li-Hsiang Sun, San Diego, CA (US); Xiaofei Wang, Cedar Grove, NJ (US); Rui Yang, Greenlawn, NY (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 0 days.

(21) Appl. No.: 17/052,234

(22) PCT Filed: May 3, 2019

(86) PCT No.: PCT/US2019/030630
§ 371 (c)(1),
(2) Date: Nov. 2, 2020

(87) PCT Pub. No.: WO2019/213542
PCT Pub. Date: Nov. 7, 2019

(65) Prior Publication Data
US 2021/0136777 A1 May 6, 2021

Related U.S. Application Data

(60) Provisional application No. 62/666,486, filed on May 3, 2018.

(51) Int. Cl.
*H04B 17/309* (2015.01)
*H04W 72/08* (2009.01)

(52) U.S. Cl.
CPC ........ *H04W 72/082* (2013.01); *H04B 17/309* (2015.01)

(58) Field of Classification Search
CPC ....... H04B 17/309; H04B 7/0617; H04L 5/14; H04L 5/0007; H04L 5/001; H04L 5/0035; H04W 72/082; H04W 74/0816
See application file for complete search history.

(56) References Cited

U.S. PATENT DOCUMENTS

| | | | |
|---|---|---|---|
| 2009/0028074 A1 | 1/2009 | Knox | |
| 2015/0078215 A1* | 3/2015 | Zhou | H04L 47/14 370/277 |
| 2018/0091283 A1* | 3/2018 | Wang | H04W 52/325 |

OTHER PUBLICATIONS

Banerjea et al., "A Simplified Simultaneous Transmit and Receive MAC Proposal," IEEE 802.11-14/0340-00hew (Mar. 17, 2014).
(Continued)

*Primary Examiner* — Melvin C Marcelo
*Assistant Examiner* — Natali Pascual Peguero
(74) *Attorney, Agent, or Firm* — Volpe Koenig

(57) ABSTRACT

Methods and apparatus for interference discovery for full-duplex data transmission are provided. In an embodiment, a station (STA) receives a full-duplex request message from an access point (AP). The STA transmits a first full-duplex response message to the AP. The STA listens for a second full-duplex response message transmitted from a second STA to the AP. The STA determines a received power of the second full-duplex response message from the second STA to the AP. The STA receives a first trigger message from the AP. The first trigger message includes information to perform full-duplex data transmission. The STA transmits data to the AP in response to the first trigger message. The STA transmits interference information to the AP. The interference information is based on the determined received power.

18 Claims, 17 Drawing Sheets

(56) References Cited

OTHER PUBLICATIONS

Bharadia et al., "Full Duplex Radios," SIGCOMM (Aug. 12-16, 2013).
Bian et al., "Co-time Co-frequency Full Duplex for 802.11 WLAN," IEEE 802.11-13/0765r2 (Jul. 17, 2013).
Bourdoux et al., "Full-duplex Technology for HEW," IEEE 11-13/0764r1 (Jul. 14, 2013).
Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Enhancements for High Efficiency WLAN, IEEE P802.11ax/D2.2 (Feb. 2018).
Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 1: Enhancements for High Efficiency WLAN, IEEE P802.11ax/D4.1 (Apr. 2019).
Duarte et al., "Design and Characterization of a Full-duplex Multi-antenna System for WiFi networks," arXiv:1210.1639 (Oct. 2012).
Gilb et al., "802.11 Full Duplex," IEEE 802.11-18/0191r0 (Jan. 15, 2018).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).
Jain et al., "Practical, Real-time, Full Duplex Wireless," MobiCom (Sep. 19-23, 2011).
Kim et al., "Janus: A Novel MAC Protocol for Full Duplex Radio," CSTR 2013-02 (Jul. 23, 2013).
Levis, "STR Radios and STR Media Access," IEEE 802.11-13/1421r1 (Nov. 12, 2013).
Oteri et al., "FD Architecture in 802.11," IEEE 802.11-18/1224r1 (Jul. 5, 2018).
Oteri et al., "Technical Reporton Full Duplex for 802.11—FD Architecture," 802.11/18-1225r1 (Jul. 2018).
Qu et al., "MU-FuPlex: A Multiuser Full-Duplex MAC Protocol for the Next Generation Wireless Networks," IEEE Wireless Communications and Networking Conference, pp. 1-6 (Mar. 2017).
Singh et al., "Efficient and Fair MAC for Wireless Networks with Self-Interference Cancellation," International Symposium of Modeling and Optimization of Mobile, Ad Hoc, and Wireless Networks, pp. 94-101 (May 2011).
Srinivasan et al., "Beyond Full Duplex Wireless," Asilomar Conference on Signals, Systems and Computers (Nov. 2012).
Taori et al., "Considerations for In-Band Simultaneous Transmit and Receive (STR) feature in HEW," IEEE 11-13/1122r1 (Sep. 16, 2013).
Xin et al., "Technical Reporton Full Duplex for 802.11," IEEE 802.11/18-1225r1 (Aug. 2018).

* cited by examiner

INTERFERENCE DISCOVERY AND CANCELLATION FOR WLAN WITH FULL DUPLEX RADIOS

CROSS-REFERENCE TO RELATED APPLICATIONS

This application is the U.S. National Stage, under 35 U.S.C. § 371, of International Application No. PCT/US2019/030630 filed May 3, 2019, which claims the benefit of U.S. Provisional Application No. 62/666,486 filed May 3, 2018 the contents of which are incorporated herein by reference.

BACKGROUND

Conventional wireless communication systems are typically restricted to transmissions for the downlink and associated receptions in the uplink, or vice-versa, using a combination of time/frequency/space/polarization dimensions to separate the downlink and uplink transmissions. A radio on a particular frequency and band may only either transmit or receive at a particular time instant due to limitations in isolation capabilities. Separation of transmitted and received signals may be accomplished using frequency based separation such as a Frequency Division Duplex (FDD) transmission scheme or a time based separation such as a Time Division Duplex (TDD) transmission scheme.

SUMMARY

Methods and apparatus for interference discovery for full-duplex data transmission are provided. In an embodiment, a station (STA) is configured to receive a full-duplex request message from an access point (AP). The STA is configured to transmit a first full-duplex response message to the AP. The STA is configured to listen for a second full-duplex response message transmitted from a second STA to the AP. The STA is configured to determine a received power of the second full-duplex response message from the second STA to the AP. The STA is configured to receive a first trigger message from the AP. The first trigger message includes information to perform full-duplex data transmission. The STA is configured to transmit data to the AP in response to the first trigger message. The STA is configured to transmit interference information to the AP. The interference information is based on the determined received power. The STA is configured to receive a second trigger message from the AP. The STA is configured to receive an acknowledgement message from the AP based on the second trigger message.

In an embodiment, a STA is configured to receive a full-duplex request message from an access point (AP). The STA is configured to listen for a first full-duplex response message transmitted from a second STA to the AP. The STA is configured to determine a received power of the first full-duplex response message from the second STA to the AP. The STA is configured to determine whether the received power is greater than a threshold. The STA is configured to transmit a second full-duplex response message to the AP. The STA is configured to transmit a full-duplex indication to the AP. The full-duplex indication is based on the determination of whether the received power is greater than a threshold. The STA is configured to receive a first trigger message from the AP. The first trigger message includes full-duplex transmission configuration information. The STA is configured to transmit data to the AP. The STA is configured to receive a second trigger message. The second trigger message includes acknowledgement transmission configuration information. The STA is configured to transmit an acknowledgement message to the AP. The acknowledgment message is transmitted based on the second trigger message.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
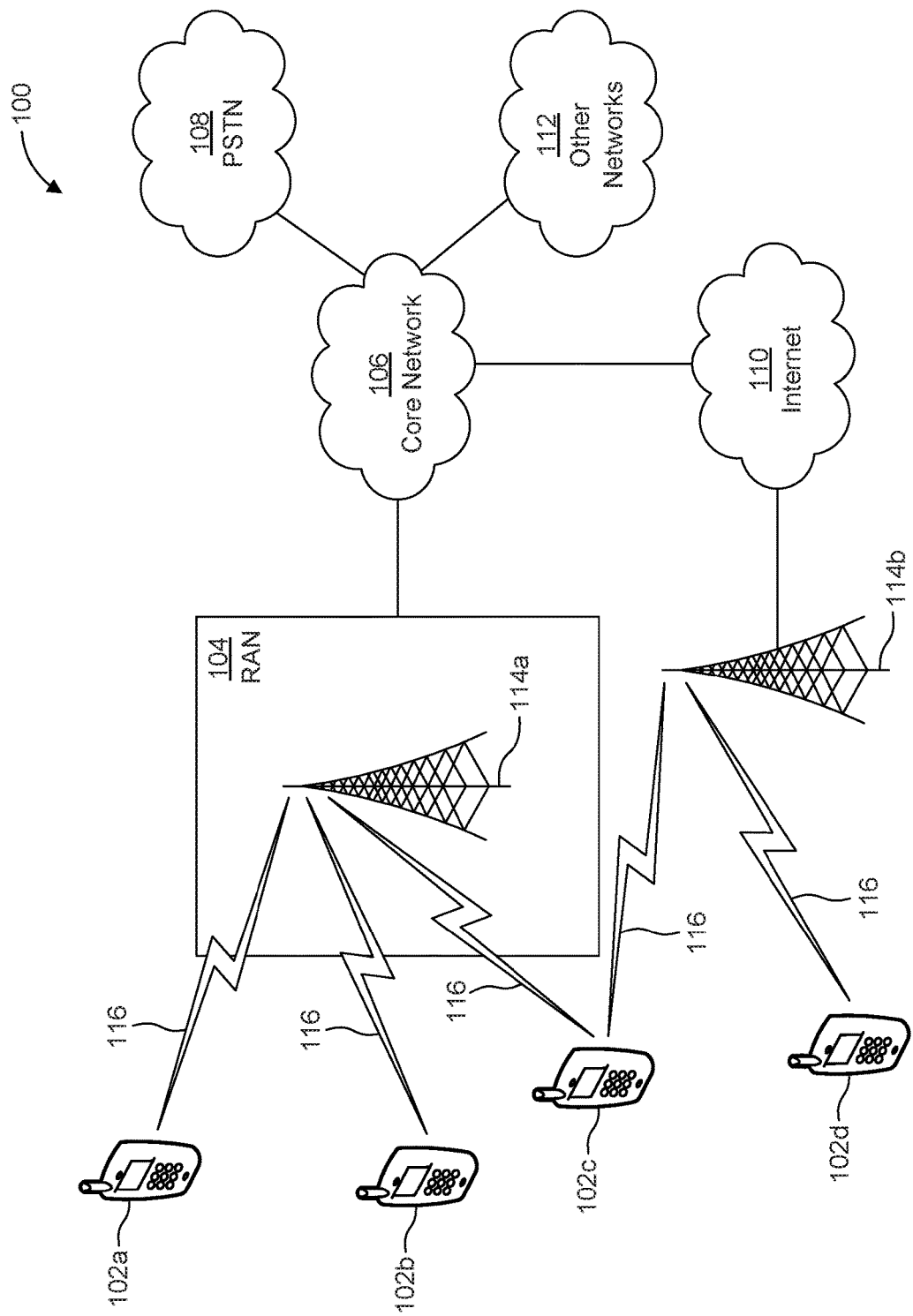
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
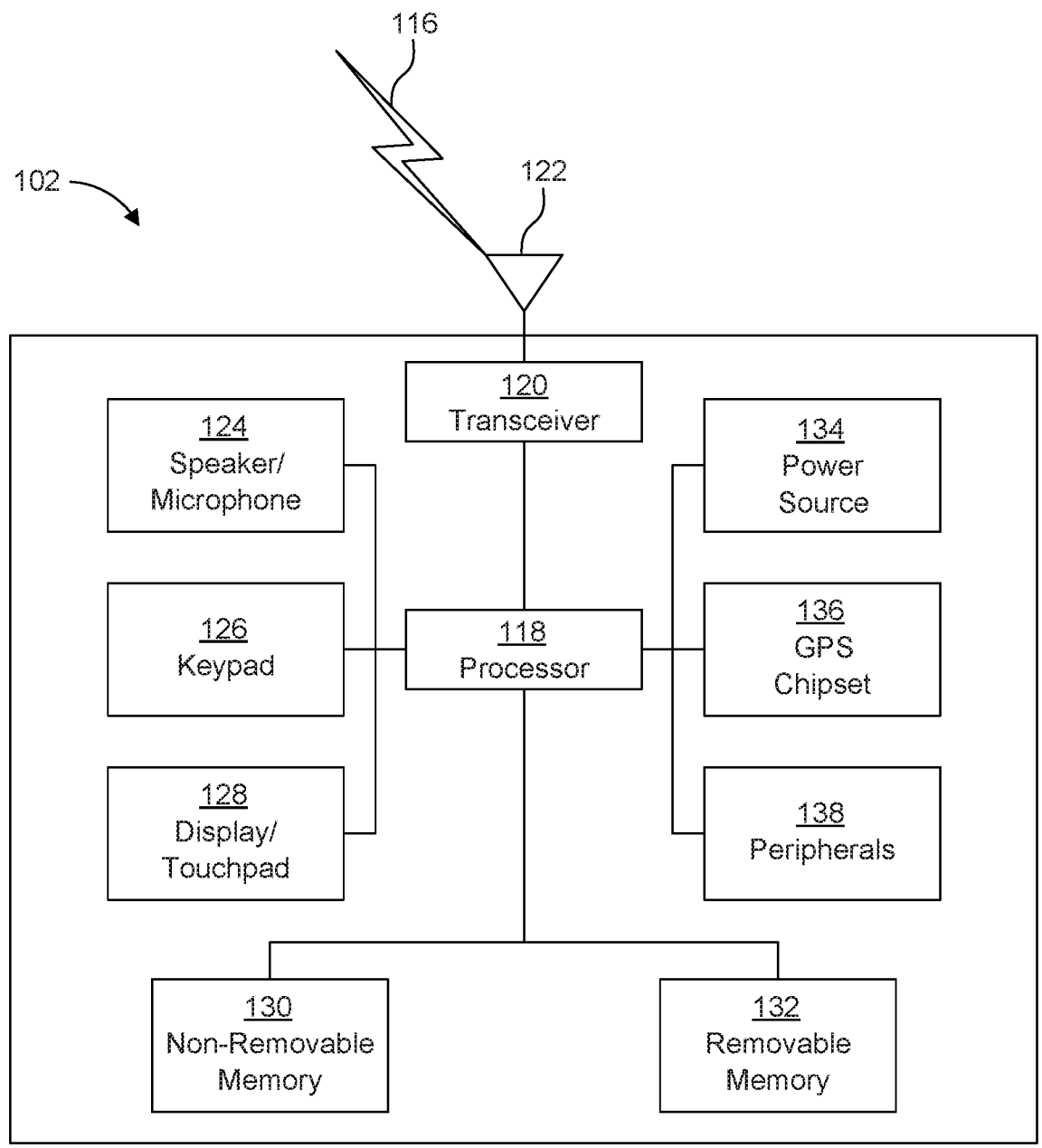
FIG. 1B is a system diagram illustrating an example wireless transmit/receive unit (WTRU) that may be used within the communications system illustrated in FIG. 1A according to an embodiment.
Figure 1C:
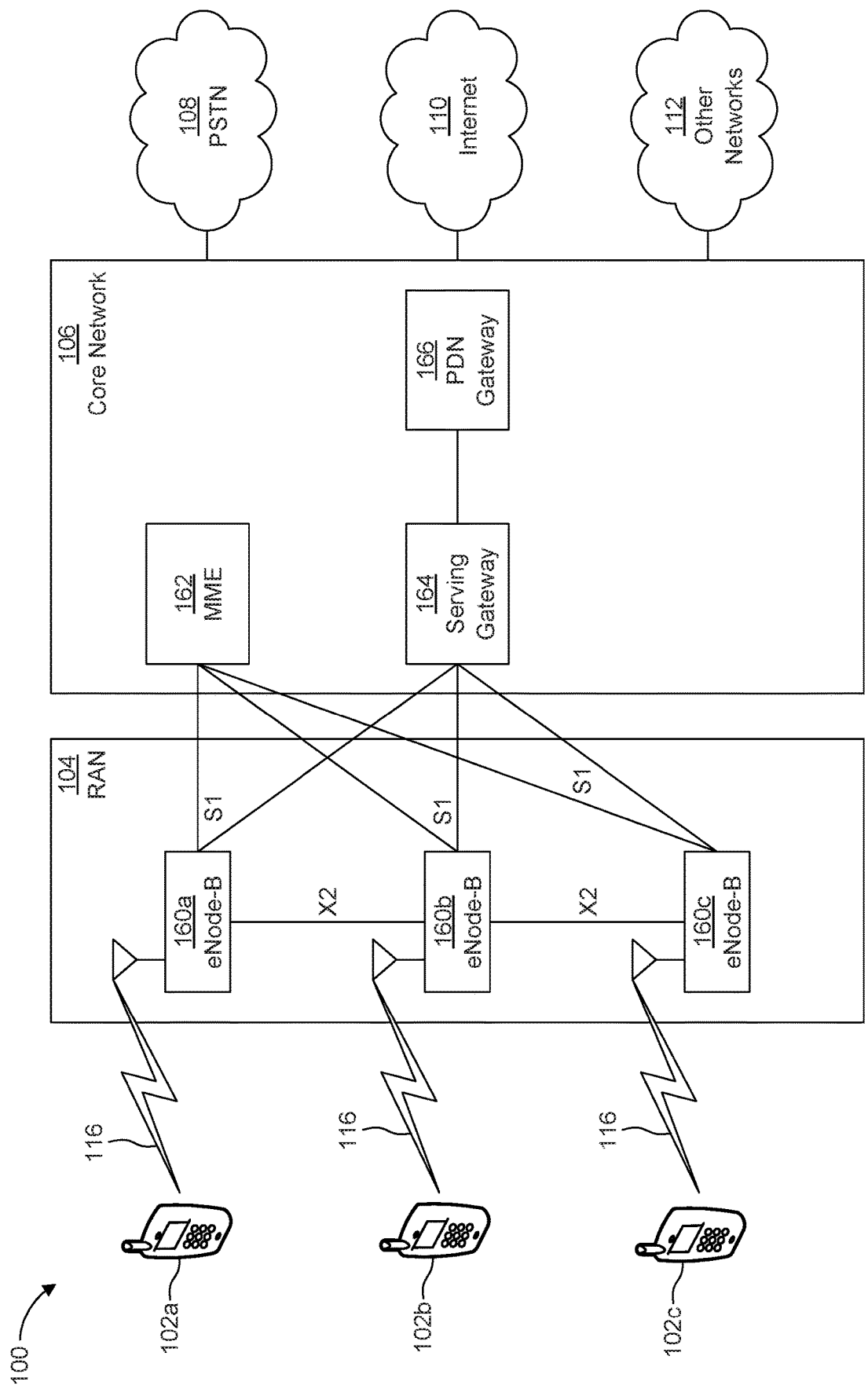
FIG. 1C is a system diagram illustrating an example radio access network (RAN) and an example core network (CN) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 10:
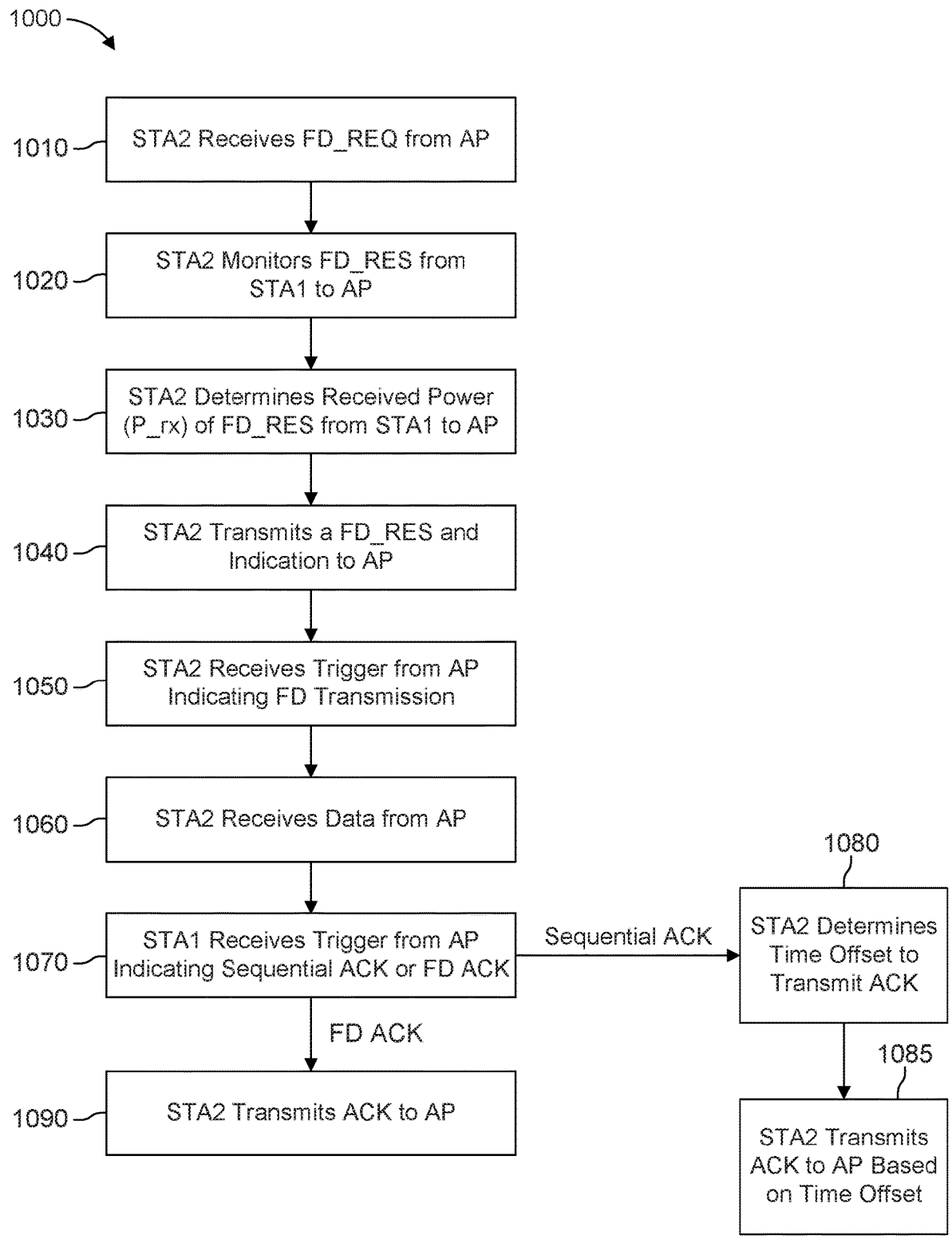
FIG. 10 is an example procedure of two way interference discovery and full-duplex transmission for a secondary station.

FIG. 10 is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
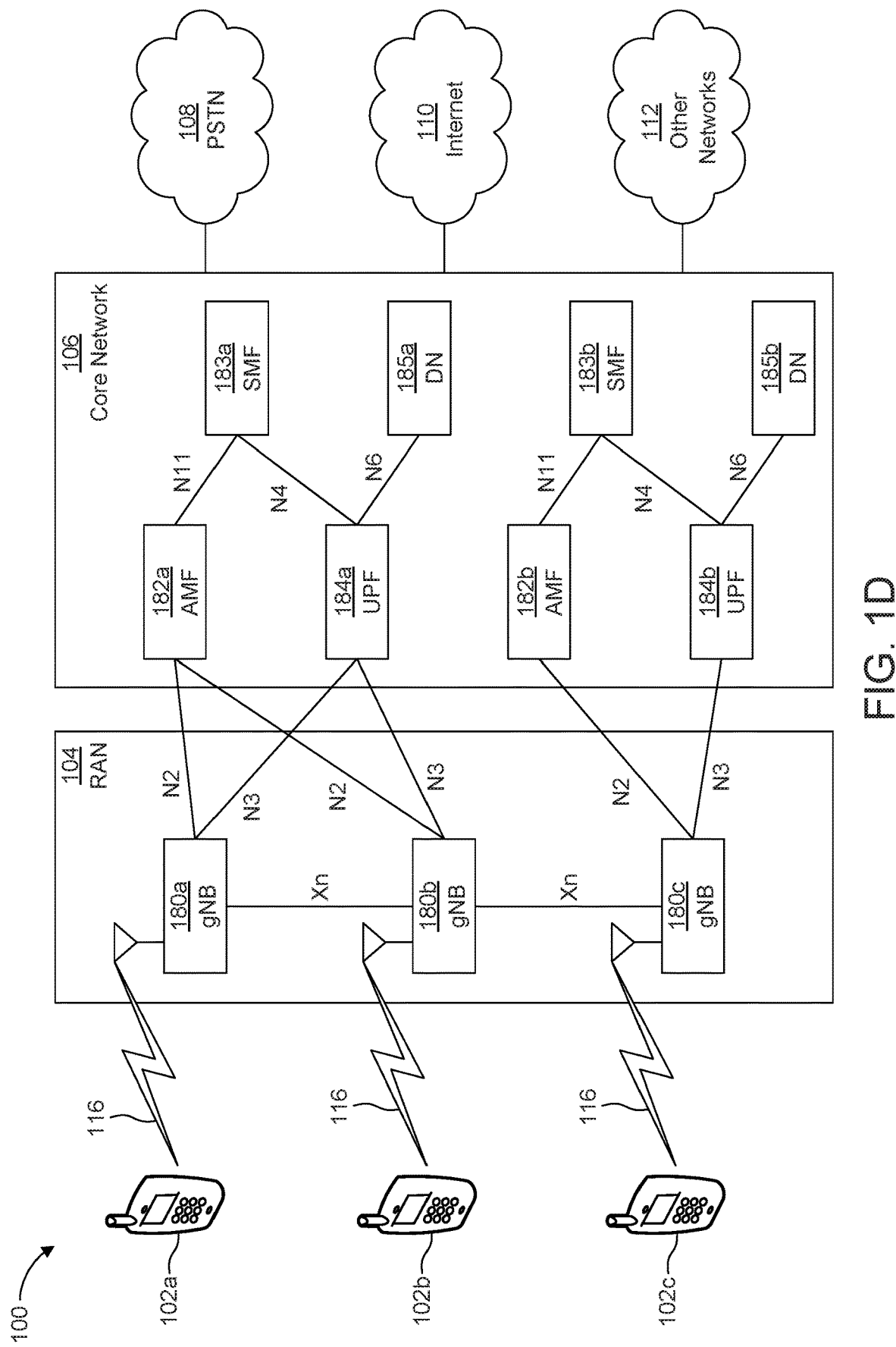
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Full duplex communication at a physical layer may be feasible using self-interference cancellation techniques.

Figure 2:
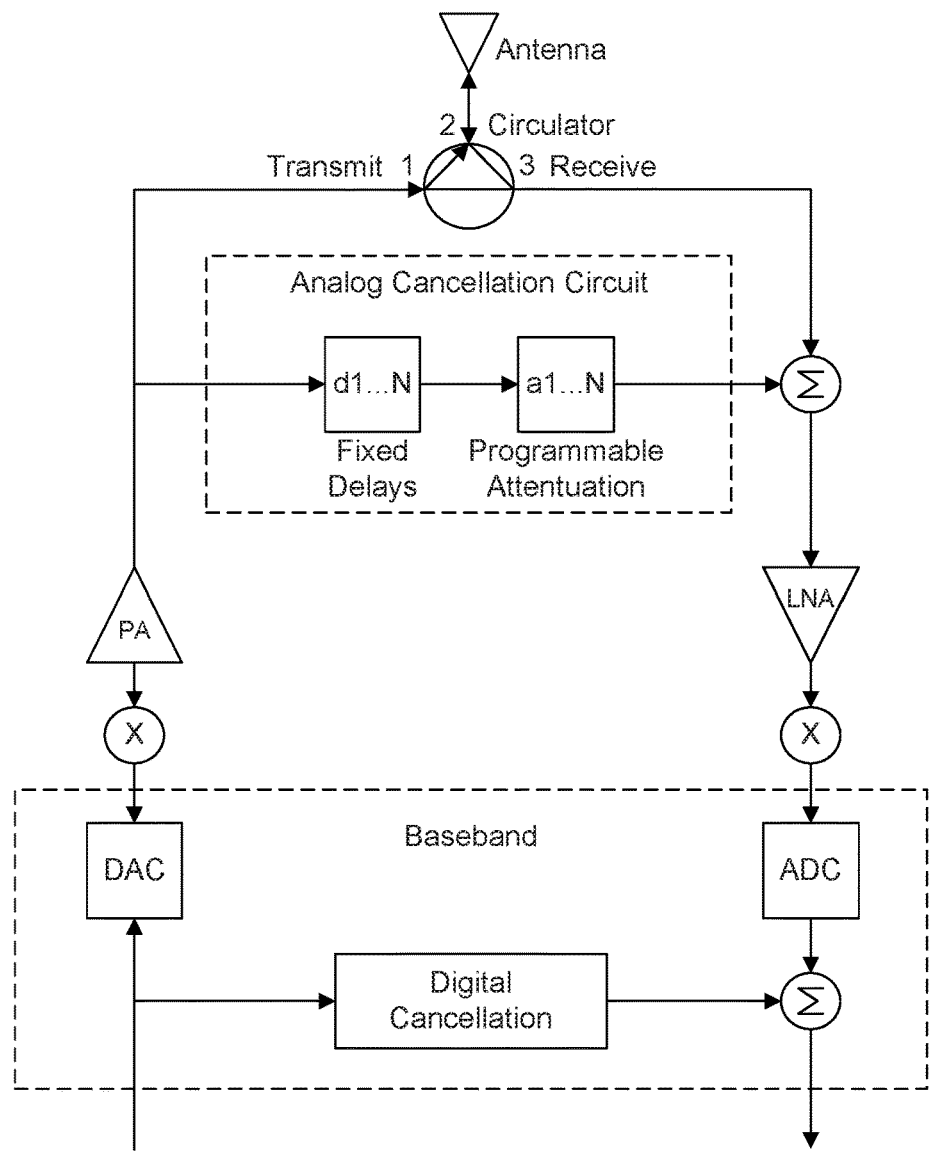
FIG. 2 is an example full duplex wireless transceiver diagram.

FIG. 2 is an example of a full duplex wireless (FDW) transceiver. A FDW transceiver that is capable of simultaneous transmission and reception may comprise functions such as antenna isolation, analog cancellation, and digital cancellation. Each of these functions may provide a specific degree of transmission and reception isolation/cancellation, and each may do so with a unique set of design constraints and limitations.

Antenna isolation may provide approximately 25 to 40 dB of isolation of transmit and receive signal paths. Analog cancellation may provide approximately 25 to 30 dB of isolation of transmit and receive signal paths. Digital cancellation may provide approximately 10 to 25 dB of isolation of transmit and receive signal paths. A FDW transceiver may provide up to 80 dB of isolation of transmit and receive signal paths by using a combination of antenna isolation, analog cancellation, and digital cancellation. This may be considered to be a minimum amount of isolation necessary for a practical FDW transceiver.

Antenna isolation may be accomplished using a number of different approaches including physical alignment or location, phase cancellation, and/or isolation using a circulator. Approximately 30 dB of isolation may be achieved using these approaches for antenna isolation.

Analog cancellation may address interference from the transmit path to the receive path through the use of a cancellation signal that may be applied to a received signal. A method for analog cancellation includes the use of a balun for coupling a portion of the transmit signal, and inverting the transmit signal prior to cancellation in the receive path. Another method for analog cancellation includes the use of an analog cancellation circuit to actively adjust the cancellation signal. Another method for analog cancellation includes the use of a branch line coupler.

Digital cancellation may be used to remove residual interference from the antenna isolation and RF cancellation stages of the transceiver. Although digital cancellation may provide approximately 10 to 25 dB of isolation, this may not be sufficient without other elements of signal cancellation. Achieving a higher degree of digital cancellation may result in quantization limitations for current broadband digital converter technologies.

Digital cancellation may include estimating a self-interference of a received signal and using a channel estimate on the known transmit signal to generate digital reference samples for subtracting from the received signal. The quality of digital cancellation may depend on the quality of channel estimation. If an FDW system is implemented in a WLAN system, channel estimation may be prone to interference due to STAs which cause interference during a training period of the reception. A method to address this issue may include the use of an interference-free period for channel estimation via carrier sense.

Figure 3:
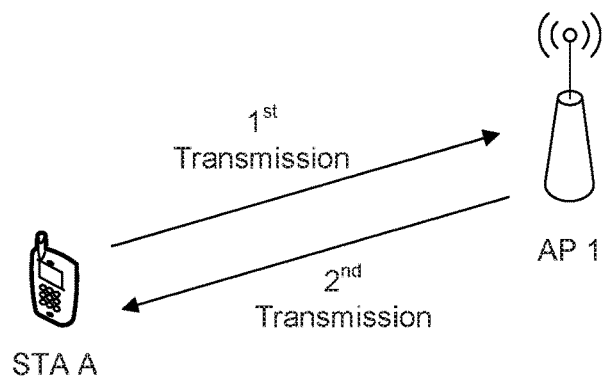
FIG. 3 is an example pair-wise (symmetric) full-duplex operation scenario.

FIG. 3 is an example pair-wise (symmetric) full-duplex scenario that includes a full-duplex capable node (AP 1) and another full-duplex capable node (STA A) involved in full-duplex operation, where both AP 1 and STA A may transmit and receive at the same time.

Figure 4:
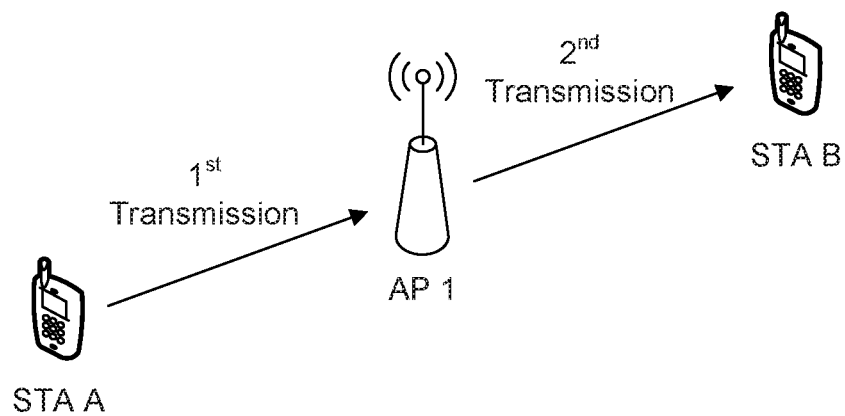
FIG. 4 is an example asymmetric full-duplex operation scenario.

FIG. 4 is an example asymmetric full-duplex scenario that includes three nodes (AP 1, STA A, and STA B) involved in full-duplex operation. Only node AP 1 is required to be full-duplex capable since it is the only node that may be transmitting and receiving at the same time in this scenario. The other two nodes (STA A and STA B) may be half-duplex capable.

A first transmission in a full-duplex operation may be defined as a primary transmission, and the corresponding transmitter and receiver may be defined as a primary transmitter and primary receiver. A second transmission in a full-duplex operation may be defined as a secondary transmission, and the corresponding transmitter and receiver may be defined as the secondary transmitter and secondary receiver.

A proposal for MAC design to support full-duplex operation in a WLAN network may include: CSMA/CA-based algorithm; support pair-wise and unrestricted STR scenarios; modification of current acknowledgement (ACK); an order of sending ACKs after full duplex transmission; add a new feature—secondary transmission; determine the destination of a secondary transmission based on history-based interfering table; add a new feature—primary collision mechanism; use secondary transmission as an implicit ACK; all nodes to be STR-aware; cannot support legacy 802.11 devices.

Another proposal for MAC design for full-duplex operation may include: focus on pair-wise STR scenario; modification of current ACK; modify the priority of sending ACKs to be higher than waiting for ACKs; modification of current overhearing behavior; after one successful full-duplex transmission, every node waits for EIFS to start next contention; adds a new feature—pairwise secondary transmission; embed the initiation of secondary transmission in RTS-CTS exchange; compatible with existing 802.11 devices with higher contention overhead (EIFS).

Another proposal for MAC design for full-duplex operation may include: AP-centralized algorithm; support pair-wise and unrestricted STR scenarios; a new centralized medium access mechanism; controlled by AP and operated in a 3-step cycle; AP collects information about data-length and interference relationship from STAs; AP broadcasts the scheduling decision packet and initiates data transmissions; send ACKs in a predefined order embedded in a scheduling decision packet; all nodes to be STR-aware; cannot support legacy 802.11 devices.

In order to utilize the wireless spectrum more efficiently, in-band full duplex may be used for 802.11ax (HEW SG). A proposal may provide a high level design for in-band full-duplex MAC that may include: adding STR preamble to support in-band full duplex; partial AID in the VHT-SIGA1 indicates recipient of PPDU; Group ID/Partial AID of STA2 indicates STA-2 should also transmit; STA-2 should end PPDU transmission before L_LENGTH Duration; In-Band STR capable AP can transmit and receive ACK simultaneously; STA feedbacks the status of transmit buffer at STAs to the AP to enable scheduling UL transmission.

Figure 5:
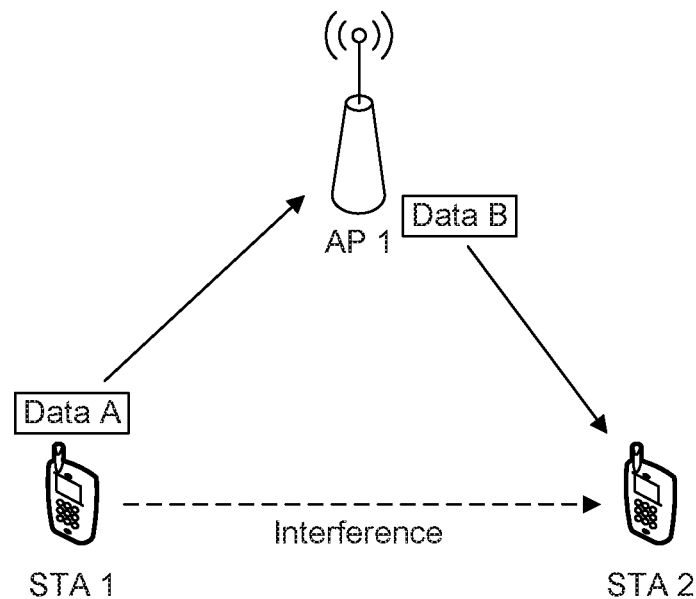
FIG. 5 is an example asymmetric full-duplex operation scenario.

FIG. 5 is an example of asymmetric full-duplex operation. AP 1 may be in a full duplex mode and may perform self-interference cancellation. AP 1 may transmit data (data A) to AP 1 and AP 1 may transmit data (data B) to STA 2. When STA 1 transmits data A to AP 1 and AP 1 transmits data B to STA 2, STA 2 may hear the transmission from STA 1 to AP 1 as interference. Full duplex interference discovery procedures and full duplex transmission set up procedures may be useful to support full-duplex operation in WLAN or an EDMA/CA system, so that a primary transmitter does not cause interference to a secondary receiver.

Figure 6:
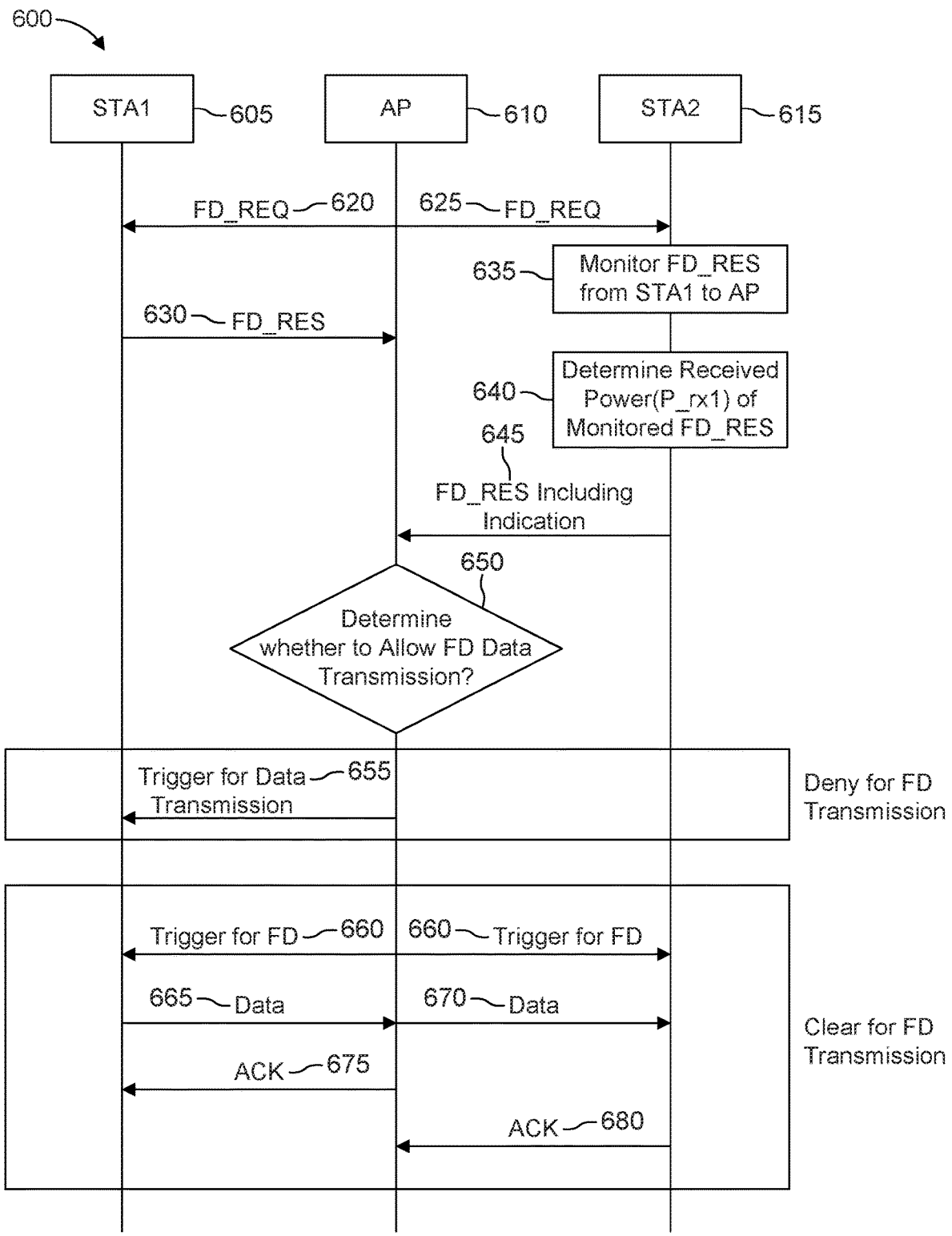
FIG. 6 is an example procedure of one way interference discovery and full-duplex transmission.

FIG. 6 is an example procedure 600 of one way interference discovery for full-duplex (FD) transmission. One way interference discovery may include a preparation stage and a data transmission stage. An interference measurement may be performed in a preparation stage. An AP 610 may acquire the medium. The AP may transmit a full duplex request (FD_REQ) message 620 to STA1 605 and a FD_REQ message 625 to STA2 615. In the FD_REQ messages, STA1 may be identified as a primary STA which may indicate that STA1 may transmit a data packet to the AP in an upcoming FD transmission, and STA2 may be identified as a secondary STA for an upcoming FD transmission, which may indicate that the AP may transmit a data packet to STA2 in an upcoming FD transmission. The FD_REQ message 625, may include a time offset for STA2 to transmit a responding message, full duplex response (FD_RES), to the AP. FD_REQ message 620 and FD_REQ message 625 may be a same message, which may include the information mentioned above such as primary/secondary STA indication and time offset. The FD_REQ message 620 and the FD_REQ message 625 may use the same time-frequency resources and may use different spatial streams. FD_REQ message 620 and FD_REQ message 625 may be different messages that may use different time-frequency resources. The FD_REQ message 620, 625, may include an identification and/or timing information. The identification and timing information may include a time measurement request for a STA to perform a time measurement that may be used later for timing adjustment. The identification and timing information may include a timing adjustment such as a timing advance, time offset, or time adjustment.

STA1, as the primary STA, may transmit a FD_RES message 630 to the AP. STA1 may transmit the FD_RES message if the channel is clear and no network allocation vector (NAV) is set. STA1 may use beamforming or spatial precoding to transmit the FD_RES message. The spatial precoding of the FD_RES message may be the same as in the upcoming data transmitted from STA1 to the AP.

STA2, as the secondary STA, may monitor 635 the FD_RES transmission from STA1 to the AP. STA2 may determine 640 a received power (P_rx1) of the monitored FD_RES transmission. STA2 may transmit a FD_RES message 645 after the FD_RES message transmitted by STA1. STA2 may start the FD_RES transmission at a time offset indicated in the FD_REQ message 625. STA2 may transmit feedback to the AP based on P_rx1 so that the AP may determine whether to perform FD transmission. The feedback may be an indication of clear for FD transmission if P_rx1 is less than a threshold. The feedback may be an indication of deny for FD transmission if P_rx1 is greater than a threshold. The feedback may be included in the FD_RES message 645. If P_rx1 is equal to the threshold, STA2 may transmit an indication of clear for FD transmission or may transmit an indication of deny for FD transmission. The threshold may be predefined or predetermined. The threshold may be signaled by the AP using a beacon message or other type of control/management messages. STA2 may transmit feedback to the AP based on the received power P_rx1 without making a decision regarding clear or deny for FD.

The AP may determine 650 whether to allow FD data transmission. The AP may determine whether to allow FD data transmission based on the feedback in the FD_RES from STA2. If the feedback from STA2 indicates deny for FD transmission, the AP may terminate a planned FD transmission and may send a trigger message 655 to STA1 to allow a transmission from STA1 to the AP. If the feedback from STA2 indicates clear for FD transmission, the AP may transmit a trigger message 660 to both STA1 and STA2 to announce the start of FD transmission. Unintended STAs may set their NAV accordingly.

The trigger message may include one or more fields. The trigger message may include one or more STA ID fields. For example, as in FIG. 6, the trigger message may include two STA IDs (i.e. STA1 and STA2). The trigger message may include one or more STA role fields, such as a primary FD STA and/or secondary FD STA. For example, as in FIG. 6, STA1 may be identified as a primary STA and STA2 may be identified as a secondary STA. The trigger message may include one or more FD transmission duration fields such as indicating the duration of a transmission opportunity (TXOP). A duration field may include a duration used for an acknowledgement transmission. The trigger message may include one or more FD acknowledgment fields such as indicating an FD ACK transmission or a sequential ACK transmission, which may be predefined or predetermined. The trigger message may include one or more header setting fields for the primary STA. A header setting field may carry the following information: bandwidth used for an upcoming transmission from the primary STA to the AP; MCS used for an upcoming transmission from the primary STA to the AP; precoding/beam used for an upcoming transmission from the primary STA to the AP; cyclic prefix used for an upcoming transmission from the primary STA to the AP; padding used for an upcoming transmission from the primary STA to the AP to align with DL transmission from the AP to the secondary STA.

After transmitting the trigger message, the AP may prepare for reception of data from STA1, and STA2 may prepare for reception of data from the AP. The AP may transmit data 670 to STA2, and STA1 may transmit data 665 to the AP in FD operation.

An acknowledgement (ACK) of a data transmission may be transmitted sequentially. The AP may transmit an ACK 675 to STA1 for the primary transmission (data transmission from STA1 to the AP). ACK 675 may be transmitted after the end of the FD data transmissions. STA2 may transmit an ACK 680 to the AP for the secondary transmission (data transmission from the AP to STA2). STA2 may transmit the ACK 680 after a time offset. STA2 may determine the time offset from the end of the FD data transmissions. The time offset may be predefined or predetermined to cover the time duration used for the ACK transmission from the AP to STA1. The time offset may be implicitly or explicitly signaled by the AP. A polling message may be transmitted by the AP to request the ACK transmission. In the example of FIG. 6, the primary ACK is transmitted before the secondary ACK. However, the secondary ACK may be transmitted first and then followed by the primary ACK. The ACK may be transmitted concurrently using full duplex transmissions.

The trigger message may be transmitted to start the FD transmissions. Information carried in the trigger message may be carried in the FD_REQ message and therefore the trigger message may not be needed. The preparation stage and data transmission stage may be transmitted continuously. The preparation stage may be modified to perform FD training, and FD data transmission may happen any time after the training.

Figure 7:
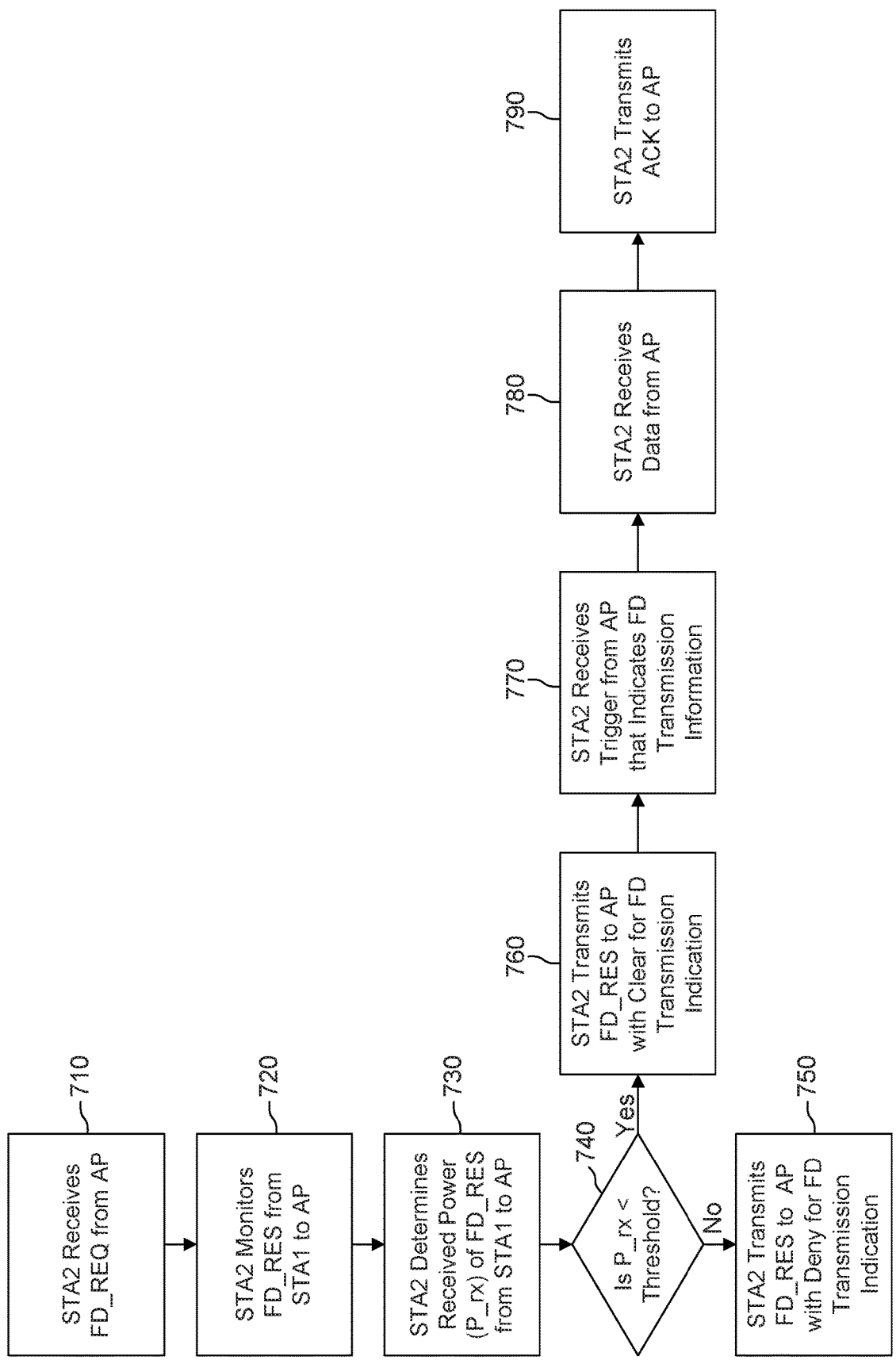
FIG. 7 is an example procedure of one way interference discovery and full-duplex transmission for a secondary station.

FIG. 7 is an example procedure 700 of one way interference discovery and FD transmission for a secondary station. STA2 615 may receive a FD_REQ message 710 from an AP

610. The FD_REQ message may indicate that STA2 is a secondary STA. STA2 may monitor 720 transmission of a FD_RES message from STA1 605, a primary station, to the AP. STA2 may determine a received power (P_rx) 730 of the FD_RES message transmission from STA1 to the AP. STA2 may determine whether P_rx is less than a threshold 740. The threshold may be predefined or predetermined. The threshold may be signaled by the AP using a beacon message or other type of control/management messages. STA2 may send feedback to the AP. The feedback may be based on P_rx.

On a condition that P_rx is not less than a threshold, STA2 may transmit a FD_RES message to the AP with feedback indicating deny for FD transmission 750. On a condition that P_rx is less than a threshold, STA2 may transmit a FD_RES message to the AP with feedback indicating clear for FD transmission 760. On a condition that P_rx is equal to the threshold, STA2 may indicate deny for transmission or clear for transmission.

STA2 may receive a trigger message 770 from the AP, in response to the transmission of the clear for FD indication. The trigger message may include FD transmission information. The trigger message may include one or more fields. The trigger message may include one or more STA ID fields. For example, the trigger message may include two STA IDs (i.e. STA1 and STA2). The trigger message may include one or more STA role fields, such as a primary FD STA and/or secondary FD STA. For example, STA1 may be indicated as a primary STA and STA2 may be indicated as a secondary STA. The trigger message may include one or more FD transmission duration fields such as indicating the duration of a transmission opportunity (TXOP). A duration field may include a duration used for an acknowledgement transmission. The trigger message may include one or more FD acknowledgment fields such as indicating an FD ACK transmission or a sequential ACK transmission, which may be predefined or predetermined. The trigger message may include one or more header setting fields for the primary STA. A header setting field may carry the following information: bandwidth used for an upcoming transmission from the primary STA to the AP; MCS used for an upcoming transmission from the primary STA to the AP; precoding/beam used for an upcoming transmission from the primary STA to the AP; cyclic prefix used for an upcoming transmission from the primary STA to the AP; padding used for an upcoming transmission from the primary STA to the AP to align with DL transmission from the AP to the secondary STA.

The trigger message may include an ACK offset. STA2 may receive data 780 from the AP. STA2 may transmit an ACK message 790 to the AP in response to the received data. The ACK transmission may be based on the ACK offset.

Figure 8:
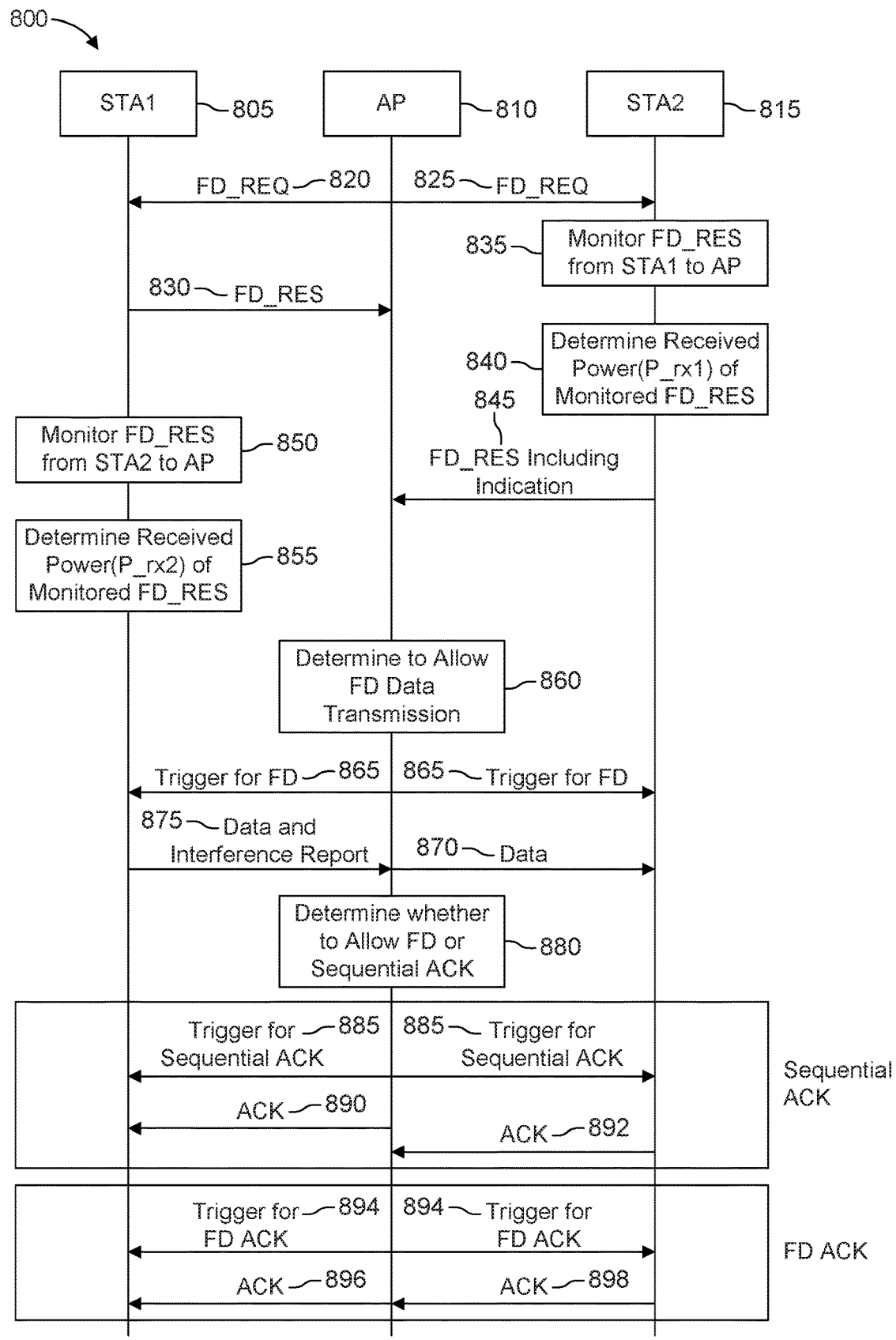
FIG. 8 is an example procedure of two way interference discovery and full-duplex transmission.

FIG. 8 is an example procedure 800 of two way interference discovery for FD transmission. Interference measurements and interference reports may be made in two directions. Two way interference discovery may include a preparation stage and a data transmission stage. An interference measurement may be performed in a preparation stage. Full duplex transmission may be used for both data transmission and acknowledgement transmission.

An AP 810 may acquire the medium. The AP may transmit a FD_REQ message 820 to STA1 805 and a FD_REQ message 825 to STA2 815. In the FD_REQ messages, STA1 may be identified as a primary STA which may indicate that STA1 may transmit a data packet to the AP in an upcoming FD transmission, and STA2 may be identified as a secondary STA, which may indicate that the AP may transmit a data packet to STA2 in an upcoming FD transmission. The FD_REQ message 825 may include a time offset for STA2 to transmit a responding message, FD_RES, to the AP. FD_REQ message 820 and FD_REQ message 825 may be a same message, which may include the information mentioned above such as primary/secondary STA indication and time offset. The FD_REQ message 820 and the FD_REQ message 825 may use the same time-frequency resources and may use different spatial streams. FD_REQ message 820 and FD_REQ message 825 may be different messages and may use different time-frequency resources. The FD_REQ message 820, 825, may include an identification and/or timing information. The identification and timing information may include a time measurement request for a STA to perform a time measurement that may be used later for timing adjustment. The identification and timing information may include a timing adjustment such as a timing advance, time offset, or time adjustment.

STA1, as the primary STA, may transmit a FD_RES message 830 to the AP. STA1 may transmit the FD_RES message if the channel is clear and no network allocation vector (NAV) is set. STA1 may use beamforming or spatial precoding to transmit the FD_RES message. The spatial precoding of the FD_RES message may be the same as in the upcoming data transmitted from STA1 to the AP.

STA2, as the secondary STA, may monitor 835 the FD_RES message transmission from STA1 to the AP. STA2 may determine 840 a received power (P_rx1) of the monitored FD_RES message transmission. STA2 may transmit a FD_RES message 845 after the FD_RES message transmitted by STA1. STA2 may start the FD_RES message transmission at a time offset indicated in the FD_REQ message 825. STA2 may transmit feedback to the AP. The feedback may be based on P_rx1. The feedback may be an indication of clear for FD transmission if P_rx1 is less than a threshold. The feedback may be an indication of deny for FD transmission if P_rx1 is greater than a threshold. The feedback may be included in the FD_RES message 845. If P_rx1 is equal to the threshold, STA 2 may transmit an indication of clear for FD transmission or may transmit an indication of deny for FD transmission. The threshold may be predefined or predetermined. The threshold may be signaled by the AP using a beacon message or other type of control/management messages. STA2 may transmit feedback to the AP based on the received power P_rx1 without making a decision regarding clear or deny for FD.

STA1, as the primary STA, may monitor 850 the FD_RES message transmission 845 from STA2 to the AP. STA1 may determine 855 a received power (P_rx2) of the monitored FD_RES message transmission from STA2 to the AP. STA1 may transmit feedback to the AP based on the received power P_rx2 without making a decision regarding clear or deny for FD.

The AP may determine whether to allow FD data transmission 860. The determination may be based on the feedback from STA2. If the feedback from STA2 to the AP indicates deny for FD transmission, the AP may terminate a planned FD transmission and may send a trigger message to STA1 to allow a transmission from STA1 to the AP. If the feedback from STA2 indicates clear for FD transmission, the AP may transmit a trigger message 865 to both STA1 and STA2 to indicate the start of an FD transmission. Unintended STAs may set NAV accordingly.

The trigger message may include one or more fields. The trigger message may include one or more STA ID fields. For example, the trigger message may include two STA IDs (i.e. STA1 and STA2). The trigger message may include one or more STA role fields, such as primary FD STA and/or secondary FD STA. For example, STA1 may be indicated as a primary STA and STA2 may be indicated as a secondary STA. The trigger message may include one or more FD transmission duration fields such as indicating the duration of a transmission opportunity (TXOP). A duration field may include a duration used for an acknowledgement transmission. The trigger message may include one or more FD acknowledgment fields such as indicating an FD ACK transmission or a sequential ACK transmission, which may be predefined or predetermined. The trigger message may include one or more FD_RES appended fields that indicate whether a FD_RES message or an interference measurement report may be aggregated with a data transmission. If this field is set, the primary STA (STA1) may aggregate an interference report with a data transmission. The interference report may carry measurements made when the secondary STA (STA2) transmit an FD_RES message to the AP. For example a quantized value of P_rx2 or whether P_rx2 is larger than a threshold. The trigger message may include one or more header setting fields for the primary STA. A header setting field may carry the following information: bandwidth used for an upcoming transmission from the primary STA to the AP; MCS used for an upcoming transmission from the primary STA to the AP; precoding/beam used for an upcoming transmission from the primary STA to the AP; cyclic prefix used for an upcoming transmission from the primary STA to the AP; padding used for an upcoming transmission from the primary STA to the AP to align with a DL transmission from the AP to the secondary STA.

After the transmission of the trigger message, a data transmission may follow. The AP may prepare for reception of data from STA1. STA2 may prepare for reception of data from the AP. The AP may transmit data 870 to STA2, and STA1 may transmit data 875 to the AP in FD operation. STA1 may include an interference report with its data transmission. The interference report may carry measurements based on the monitored FD_RES message 845 from STA2 to the AP, for example a quantized value of P_rx2 or whether P_rx2 is larger than a threshold.

The AP may determine whether to perform FD ACK or sequential/half-duplex ACK 880. The AP may determine whether to perform FD ACK or sequential ACK based on the interference report received from STA1. For example, if P_rx2 is greater than a threshold, this may indicate that a transmission from STA2 may have a significant impact to STA1 and the AP may determine to perform sequential ACK instead of FD ACK. If P_rx2 is less than a threshold, this may indicate that a transmission from STA2 may not have a significant impact to STA1 and the AP may determine to perform FD ACK. If P_rx2 is equal to a threshold, the AP may determine to use FD ACK or sequential ACK.

If the AP determines to perform sequential ACK, the AP may transmit a trigger message 885 to both STA1 and STA2 that indicates a sequential ACK procedure. Alternatively, a trigger message may be omitted. The AP may transmit an ACK 890 to STA1. STA2 may determine a time offset from the end of the second trigger message 885 or the end of the FD data transmissions 870,875. The time offset may be predefined or predetermined to cover a time duration used for an ACK transmission from the AP to STA1. The time offset may be implicitly or explicitly signaled by the AP. STA2 may transmit an ACK to the AP 892. STA2 may transmit the ACK to the AP, after the ACK 890 from the AP to STA1, based on the time offset.

If the AP determines to perform FD ACK, the AP may transmit a trigger message 894 to both STA1 and STA2 that indicates a FD ACK procedure. The AP may transmit an ACK 896 to STA1, and STA2 may transmit an ACK 898 to the AP in FD operation.

Figure 9:
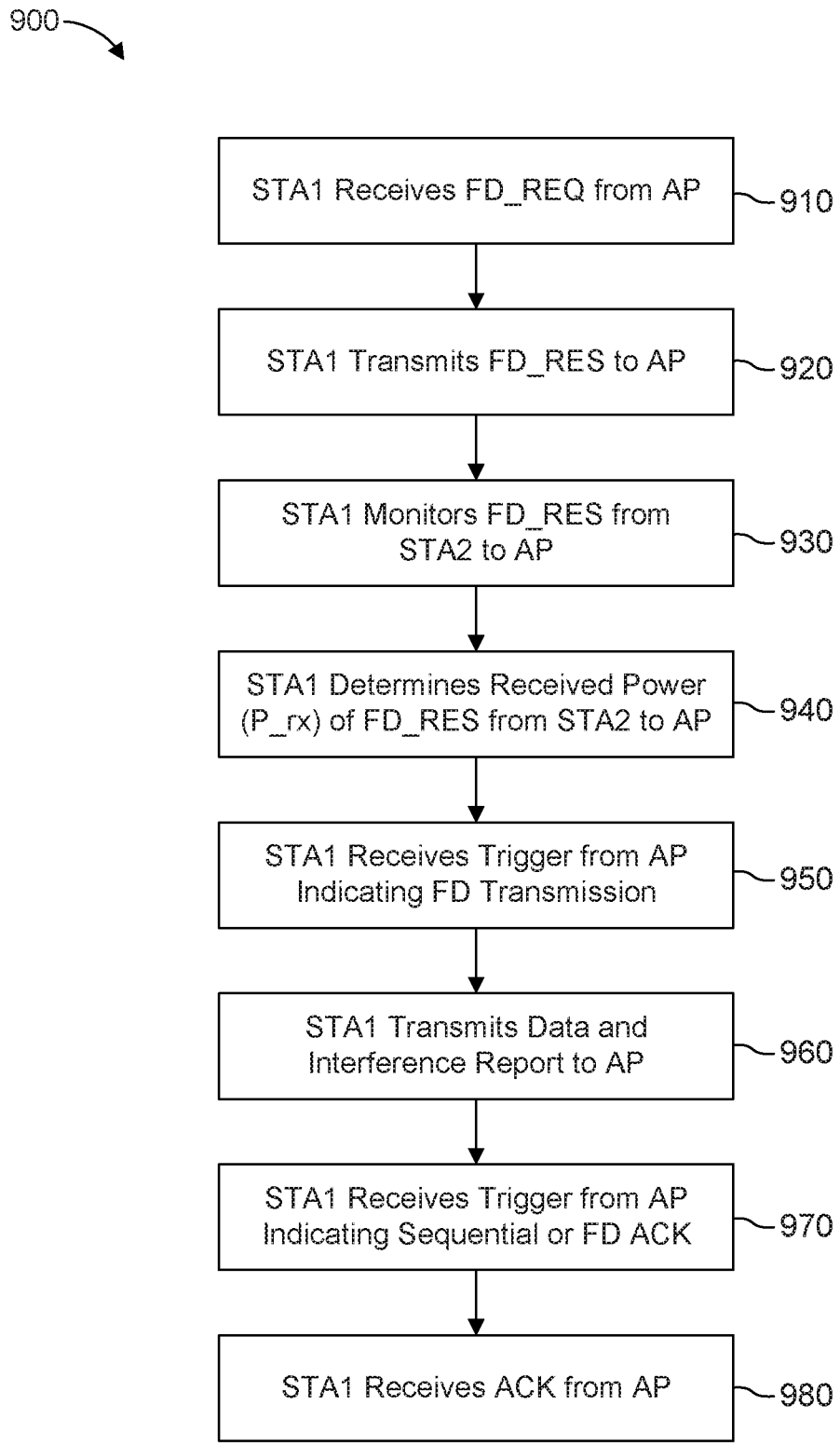
FIG. 9 is an example procedure of two way interference discovery and full-duplex transmission for a primary station.

FIG. 9 is an example procedure 900 of two way interference discovery and FD transmission for a primary station. STA1 805 may receive a FD_REQ message 910 from an AP 810. The FD_REQ message may indicate that STA1 is a primary STA. The FD_REQ message 910 may include identification and/or timing information. The identification and timing information may include a time measurement request for a STA to perform a time measurement that may be used later for timing adjustment. The identification and timing information may include a timing adjustment such as a timing advance, time offset, or time adjustment. STA1 may transmit a FD_RES message 920 to the AP. STA1 may transmit the FD_RES message if the channel is clear and no network allocation vector (NAV) is set. STA1 may use beamforming or spatial precoding to transmit the FD_RES message. The spatial precoding of the FD_RES message may be the same as an upcoming data transmitted from STA1 to the AP. STA1 may monitor 930 transmission of an FD_RES message from STA2 815, a secondary station, to the AP. STA1 may determine 940 a received power (P_rx) of the monitored FD_RES message transmission.

STA1 may receive 950 a trigger message from the AP that indicates information for FD transmission. The trigger message may include one or more fields. The trigger message may include one or more STA ID fields. For example the trigger message may include two STA IDs (i.e. STA1 and STA2). The trigger message may include one or more STA role fields, such as primary FD STA and/or secondary FD STA. For example, STA1 may be indicated as a primary STA and STA2 may be indicated as a secondary STA. The trigger message may include one or more FD transmission duration fields such as indicating the duration of a transmission opportunity (TXOP). A duration field may include a duration used for an acknowledgement transmission. The trigger message may include one or more FD acknowledgment fields such as indicating an FD ACK transmission or a sequential ACK transmission, which may be predefined or predetermined. The trigger message may include one or more FD_RES appended fields that indicate whether a FD_RES message or an interference measurement report may be aggregated with a data transmission. If this field is set, the primary STA (STA1) may aggregate an interference report with a data transmission. The interference report may carry measurements made when the secondary STA (STA2) transmit an FD_RES message to the AP. For example a quantized value of P_rx or whether P_rx is larger than a threshold. The trigger message may include one or more header setting fields for the primary STA. A header setting field may carry the following information: bandwidth used for an upcoming transmission from the primary STA to the AP; MCS used for an upcoming transmission from the primary STA to the AP; precoding/beam used for an upcoming transmission from the primary STA to the AP; cyclic prefix used for an upcoming transmission from the primary STA to the AP; padding used for an upcoming transmission from the primary STA to the AP to align with a DL transmission from the AP to the secondary STA.

STA1 may transmit data 960 to the AP. STA1 may include an interference report with the data transmission. The interference report may include measurements based on the monitored FD_RES message from STA2 to the AP, for example a quantized value of P_rx or whether P_rx is larger than a threshold.

STA1 may receive a trigger message 970 from the AP indicating whether to perform FD ACK or sequential ACK. A determination of whether to perform FD ACK or sequential ACK by the AP may be based on the interference report sent from STA1 to the AP. STA1 may receive an ACK 980 from the AP based on the trigger message received indicating whether to perform FD ACK or sequential ACK.

FIG. 10 is an example procedure 1000 of two way interference discovery and FD transmission for a secondary station. STA2 815 may receive a FD_REQ message 1010 from an AP 810. The FD_REQ message may indicate that STA2 is a secondary STA. The FD_REQ message may include a time offset for STA2 to transmit a responding message, FD_RES, to the AP. The FD_REQ message may include identification and/or timing information. The identification and timing information may include a time measurement request for a STA to perform a time measurement that may be used later for timing adjustment. The identification and timing information may include a timing adjustment such as a timing advance, time offset, or time adjustment. STA2 may monitor 1020 transmission of a FD_RES message from STA1 805, a primary station, to the AP. STA2 may determine 1030 a received power (P_rx) of the monitored FD_RES message transmission.

STA2 may transmit a FD_RES message 1040 to the AP. STA2 may start the FD_RES message transmission at a time offset indicated in the FD_REQ message from the AP. STA2 may transmit an indication of clear for FD transmission if P_rx is less than a threshold. STA 2 may transmit an indication of deny for FD transmission if P_rx is greater than a threshold. The indication may be included in the FD_RES message. If P_rx is equal to the threshold, STA 2 may transmit an indication of clear for FD transmission or may transmit an indication of deny for FD transmission. The threshold may be predefined or predetermined. The threshold may be signaled by the AP using a beacon message or other type of control/management messages.

STA2 may receive a trigger message 1050 from the AP indicating information for FD transmission. The trigger message may include one or more fields. The trigger message may include one or more STA ID fields. For example the trigger message may include two STA IDs (i.e. STA1 and STA2). The trigger message may include one or more STA role fields, such as primary FD STA and/or secondary FD STA. For example STA1 may be indicated as a primary STA and STA2 may be indicated as a secondary STA. The trigger message may include one or more FD transmission duration fields such as indicating the duration of a transmission opportunity (TXOP). A duration field may include a duration used for an acknowledgement transmission. The trigger message may include one or more FD acknowledgment fields such as indicating an FD ACK transmission or a sequential ACK transmission, which may be predefined or predetermined. The trigger message may include one or more FD_RES appended fields that indicate whether a FD_RES message or an interference measurement report may be aggregated with a data transmission. If this field is set, the primary STA (STA1) may aggregate an interference report with a data transmission. The interference report may carry measurements made when the secondary STA (STA2) transmit an FD_RES message to the AP. For example a quantized value of P_rx or whether P_rx is larger than a threshold. The trigger message may include one or more header setting fields for the primary STA. A header setting field may carry the following information: bandwidth used for an upcoming transmission from the primary STA to the AP; MCS used for an upcoming transmission from the primary STA to the AP; precoding/beam used for an upcoming transmission from the primary STA to the AP; cyclic prefix used for an upcoming transmission from the primary STA to the AP; padding used for an upcoming transmission from the primary STA to the AP to align with a DL transmission from the AP to the secondary STA.

STA2 may receive data 1060 from the AP. STA2 may receive a trigger message 1070 from the AP indicating whether to perform FD ACK or sequential ACK. A determination of whether to perform FD ACK or sequential ACK by the AP may be based on an interference report sent from STA1 to the AP. If STA2 receives a trigger message indicating sequential ACK, STA2 may determine 1080 a time offset from the end of the ACK trigger message or the end of the FD data transmissions. The time offset may be predefined or predetermined to cover a time duration used for an ACK transmission from the AP to STA1. The time offset may be implicitly or explicitly signaled by the AP. STA2 may transmit an ACK 1085 to the AP based on the time offset. If STA2 receives a trigger indicating FD ACK, STA2 may transmit 1090 an ACK to the AP.

Figure 11:
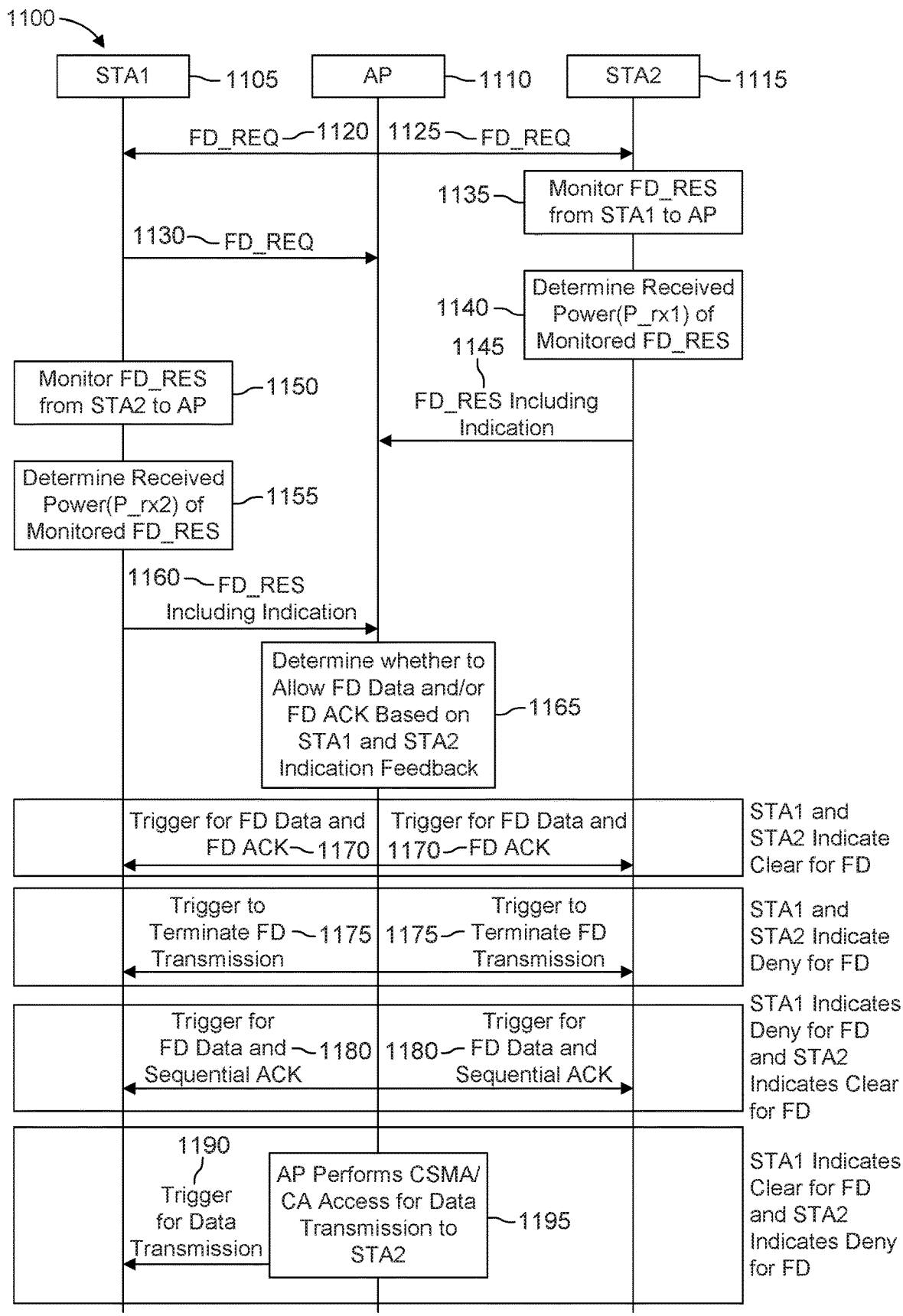
FIG. 11 is an example procedure of two way interference discovery and full-duplex transmission.

FIG. 11 is an example procedure 1100 of two way interference discovery and FD transmission. Two way interference discovery may include a preparation stage and a data transmission stage. Full duplex transmission may be used for both data transmission and acknowledgement transmission. Interference measurements and reports may be performed in a preparation stage.

An AP 1110 may acquire the medium. The AP may transmit a FD_REQ message 1120 to STA1 1105 and a FD_REQ message 1125 to STA2 1115. In the FD_REQ messages, STA1 may be identified as a primary STA which may indicate that STA1 may transmit a data packet to the AP in an upcoming FD transmission, and STA2 may be identified as a secondary STA, which may indicate that the AP may transmit a data packet to STA2 in an upcoming FD transmission. The FD_REQ message 1125 may include a time offset for STA2 to transmit a responding message FD_RES to the AP. FD_REQ message 1120 and FD_REQ message 1125 may be a same message, which may include the information mentioned above such as primary/secondary STA indication and time offset. The FD_REQ message 1120 and the FD_REQ message 1125 may use the same time-frequency resources and may use different spatial streams. FD_REQ message 1120 and FD_REQ message 1125 may be different messages that may use different time-frequency resources. The FD_REQ message 1120, 1125 may include an identification and/or timing information. The identification and timing information may include a time measurement request for a STA to perform a time measurement that may be used later for timing adjustment. The identification and timing information may include a timing adjustment such as a timing advance, time offset, or time adjustment.

STA1, as the primary STA, may transmit a FD_RES message 1130 to the AP. STA1 may transmit the FD_RES message if the channel is clear and no NAV is set. STA1 may use beamforming or spatial precoding to transmit the FD_RES message. The spatial precoding of the FD_RES message may be the same as the upcoming data transmitted from STA1 to the AP.

STA2, as the secondary STA, may monitor 1135 the FD_RES message transmission from STA1 to the AP. STA2 may determine 1140 a received power (P_rx1) of the monitored FD_RES message transmission. STA2 may transmit a FD_RES message 1145 after the FD_RES message transmitted by STA1. STA2 may start the FD_RES message transmission at a time offset indicated in the FD_REQ message 1125. STA2 may transmit feedback to the AP. The feedback may be based on P_rx1. The feedback may be an indication of clear for FD transmission if P_rx1 is less than a threshold. The feedback may be an indication of deny for FD transmission if P_rx1 is greater than a threshold. If P_rx1 is equal to the threshold, STA 2 may indicate clear for FD transmission or may indicate deny for FD transmission. The threshold may be predefined or predetermined. The threshold may be signaled by the AP using a beacon message or other type of control/management message. STA2 may transmit feedback to the AP based on the received power P_rx1 without making a decision regarding clear or deny for FD.

STA1, as the primary STA, may monitor 1150 the FD_RES transmission 1145 from STA2 to the AP. STA1 may determine 1155 a received power (P_rx2) of the FD_RES transmission from STA2 to the AP.

STA1 may transmit a second FD_RES message 1160 after the FD_RES message 1145 transmitted by STA2. STA1 may start the second FD_RES message transmission 1160 at a time offset indicated in the FD_REQ message 1120. STA1 may transmit a new control message other than the second FD_RES message. In the second FD_RES message or alternative control message, STA1 may include feedback information. The feedback may be an indication of clear for FD transmission if P_rx2 is less than a threshold. The feedback may be an indication of deny for FD transmission if P_rx2 is greater than a threshold. If P_rx2 is equal to the threshold, STA1 may indicate clear for FD transmission or may indicate deny for FD transmission. The threshold may be predefined or predetermined. The threshold may be signaled by the AP using a beacon message or other type of control/management message. STA1 may transmit feedback to the AP based on the received power P_rx1 without making a decision regarding clear or deny for FD.

Based on the feedback (indications in the FD_RES messages 1145 and 1160) from both STA1 and STA2, the AP may make a determination 1165 of whether to perform FD data transmission and/or FD ACK transmission. If both STA1 and STA2 indicate clear for FD transmission, the AP may transmit a trigger message 1170 to trigger FD transmission for both data and acknowledgement transmissions. If both STA1 and STA2 indicate deny for FD transmission, the AP may transmit a trigger message 1175 to terminate FD transmission. The AP may receive P_rx1 and P_rx2 and the AP may determine whether to trigger FD data transmission based on P_rx1 and P_rx2 and a predefined threshold.

If STA1 indicates deny for FD transmission and STA2 indicates clear for FD transmission, the AP may transmit a trigger message 1180 to indicate FD data transmission and sequential ACK transmission.

If STA1 indicates clear for FD transmission and STA2 indicates deny for FD transmission, the AP may transmit a trigger message 1190 to request STA1 to transmit data to the AP and hold the transmission from the AP to STA2. The AP may perform CSMA/CA access 1195 for transmission from the AP to STA2.

If STA1 indicates clear for FD transmission and STA2 indicates deny for FD transmission, the AP may transmit a trigger message to indicate sequential or half duplex data transmission followed by FD acknowledgement.

The data preparation stage and data/ACK transmission stage may be in the same TXOP. The data preparation stage and data/ACK transmission stage may be carried in two separate TXOP. The message exchanges in the data preparation stage may be modified for FD training.

Figure 12:
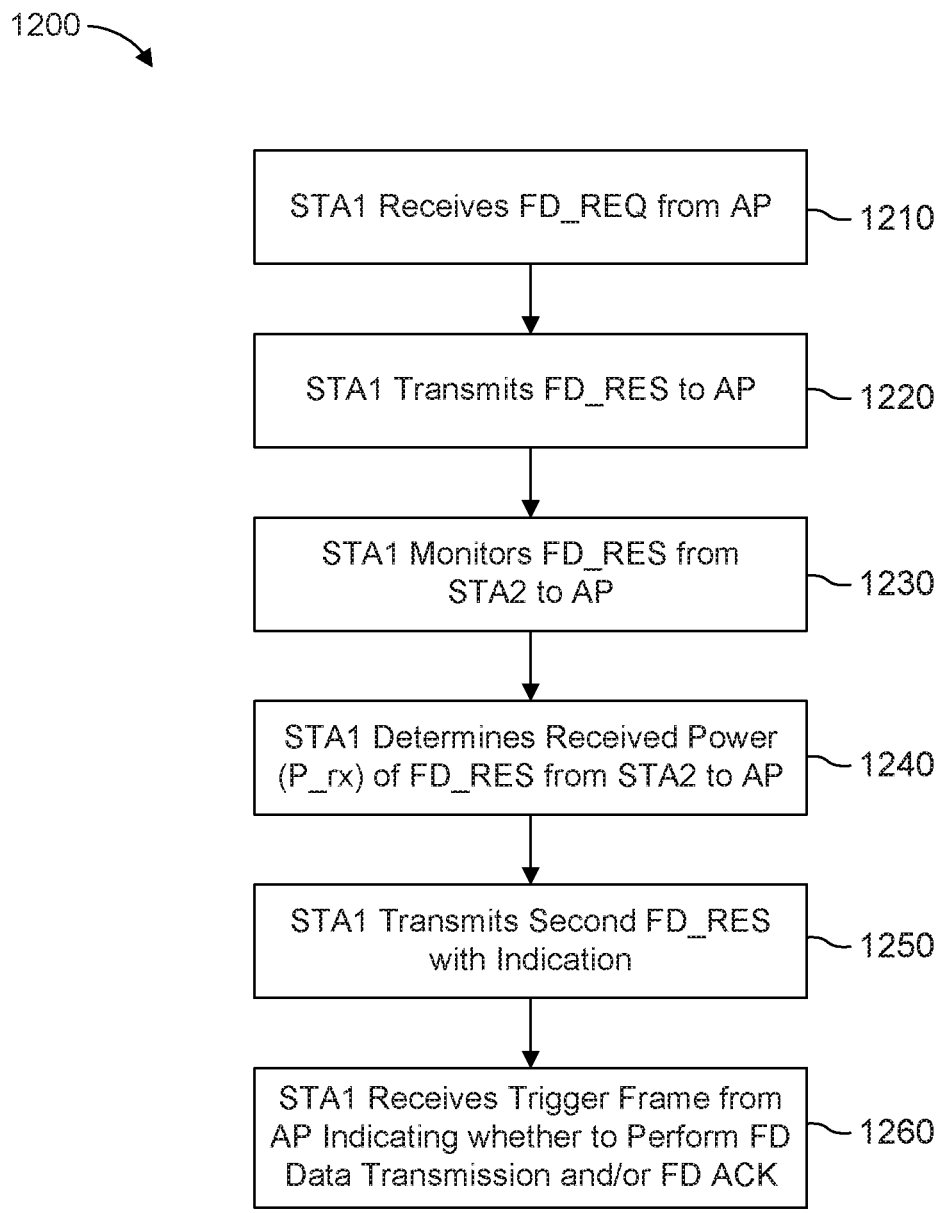
FIG. 12 is an example procedure of two way interference discovery and full-duplex transmission for a primary station.

FIG. 12 is an example procedure 1200 of two way interference discovery and FD transmission for a primary station. STA1 1105 may receive a FD_REQ message 1210 from an AP 1110. The FD_REQ message may include an indication that STA1 is a primary STA. The FD_REQ message may include identification and/or timing information. STA1 may transmit a FD_RES message 1220 to the AP. STA1 may transmit the FD_RES message if the channel is clear and no network allocation vector (NAV) is set. STA1 may use beamforming or spatial precoding to transmit the FD_RES message. The spatial precoding of the FD_RES message may be the same as the upcoming data transmitted from STA1 to the AP. STA1 may monitor 1230 transmission of an FD_RES message from STA2 1115, a secondary station, to the AP. STA1 may determine 1240 a received power (P_rx) of the monitored FD_RES message transmission.

STA1 may transmit a second FD_RES message 1250. STA1 may transmit the second FD_RES message after a FD_RES message transmitted by STA2. STA1 may start the second FD_RES message transmission at a time offset indicated in the FD_REQ message received from the AP. STA1 may transmit a new control message other than the second FD_RES message.

STA1 may transmit feedback to the AP. The feedback may be based on P_rx1. The feedback may be transmitted in the second FD_RES message or an alternative control message. The feedback may include an indication of clear for FD transmission if P_rx is less than a threshold. The feedback may include an indication of deny for FD transmission if P_rx is greater than a threshold. If P_rx is equal to the threshold, STA1 may indicate clear for FD transmission or may indicate deny for FD transmission. The threshold may be predefined or predetermined. The threshold may be signaled by the AP using a beacon message or other type of control/management message.

STA1 may receive a trigger message 1260 from the AP. The trigger message may indicate whether to perform FD data transmission. The trigger message may indicate whether to perform FD ACK transmission. The trigger message may include one or more fields. The trigger message may include one or more STA ID fields. For example the trigger message may include two STA IDs (i.e. STA1 and STA2). The trigger message may include one or more STA role fields, such as primary FD STA and/or secondary FD STA. For example STA1 may be indicated as a primary STA and STA2 may be indicated as a secondary STA. The trigger message may include one or more FD transmission duration fields such as indicating the duration of a transmission opportunity (TXOP). A duration field may include a duration used for an acknowledgement transmission. The trigger message may include one or more FD acknowledgment fields such as indicating an FD ACK transmission or a sequential ACK transmission, which may be predefined or predetermined. The trigger message may include one or more FD_RES appended fields that indicate whether a FD_RES message or an interference measurement report may be aggregated with a data transmission. If this field is set, the primary STA (STA1) may aggregate an interference report with a data transmission. The interference report may carry measurements made when the secondary STA (STA2) transmit an FD_RES message to the AP. For example a quantized value of P_rx or whether P_rx is larger than a threshold. The trigger message may include one or more header setting fields for the primary STA. A header setting field may carry the following information: bandwidth used for an upcoming transmission from the primary STA to the AP; MCS used for an upcoming transmission from the primary STA to the AP; precoding/beam used for an upcoming transmission from the primary STA to the AP; cyclic prefix used for an upcoming transmission from the primary STA to the AP; padding used for an upcoming transmission from the primary STA to the AP to align with a DL transmission from the AP to the secondary STA.

Figure 13:
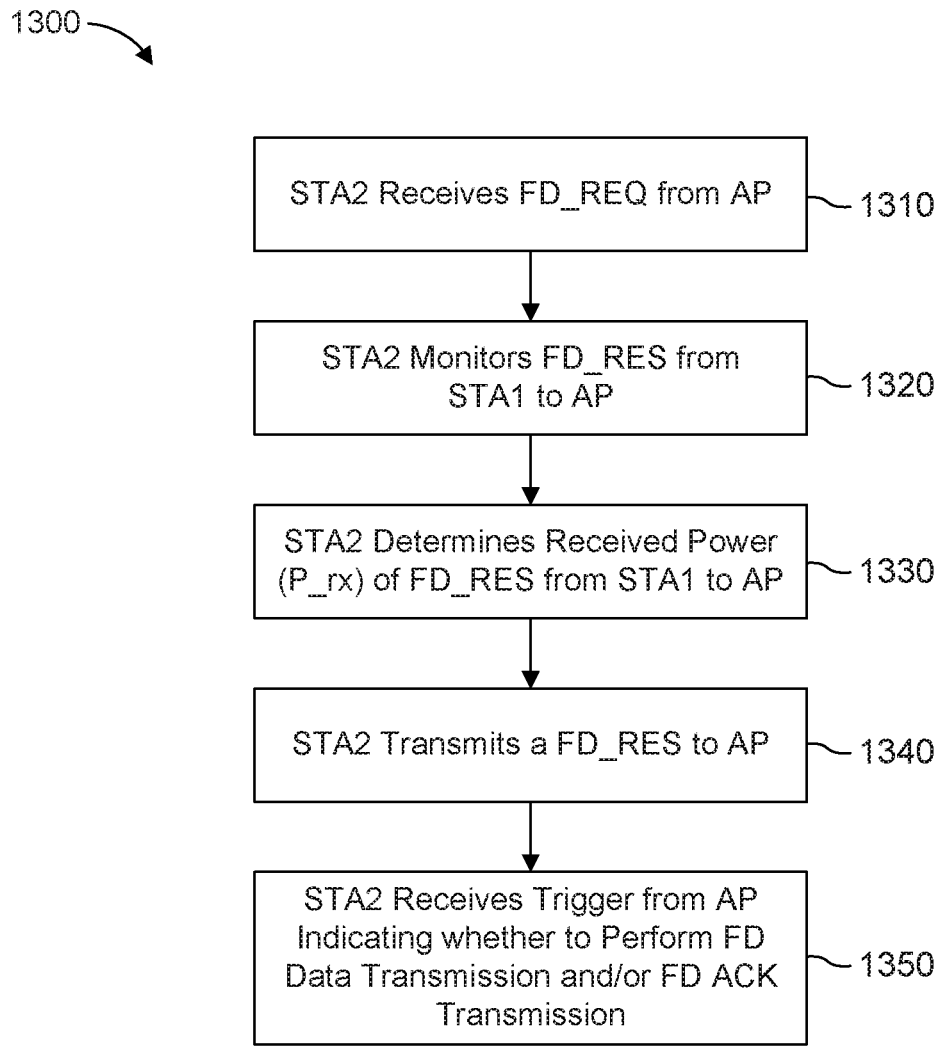
FIG. 13 is an example procedure of two way interference discovery and full-duplex transmission for a secondary station.

FIG. 13 is an example procedure 1300 of two way interference discovery and FD transmission for a secondary station. STA2 1115 may receive a FD_REQ message 1310 from an AP 1110. The FD_REQ message may include an indication that STA2 is a secondary STA. The FD_REQ message may include a time offset for STA2 to transmit a responding message FD_RES to the AP. The FD_REQ message 1310 may include an identification and/or timing information. The identification and timing information may include a time measurement request for a STA to perform a time measurement that may be used later for timing adjustment. The identification and timing information may include a timing adjustment such as a timing advance, time offset, or time adjustment.

STA2 may monitor 1320 transmission of a FD_RES message from STA1 1105, a primary station, to the AP. STA2 may determine a received power (P_rx) 1330 of the monitored FD_RES message transmission. STA2 may transmit a FD_RES message 1340 to the AP. STA2 may start the FD_RES message transmission at a time offset indicated in the FD_REQ message from the AP. STA2 may transmit feedback information to the AP. The feedback may be included in the FD_RES message. The feedback may include an indication of clear for FD transmission if P_rx is less than a threshold. The feedback information may include an indication of deny for FD transmission if P_rx is greater than a threshold. If P_rx is equal to the threshold, STA 2 may indicate clear for FD transmission or may indicate deny for FD transmission. The threshold may be predefined or predetermined. The threshold may be signaled by the AP using a beacon message or other type of control/management messages.

STA2 may receive a trigger message 1350 from the AP. The trigger message may indicate whether to perform FD data transmission. The trigger message may indicate whether to perform FD ACK transmission. The trigger message may include one or more fields. The trigger message may include one or more STA ID fields. For example the trigger message may include two STA IDs (i.e. STA1 and STA2). The trigger message may include one or more STA role fields, such as primary FD STA and/or secondary FD STA. For example STA1 may be indicated as a primary STA and STA2 may be indicated as a secondary STA. The trigger message may include one or more FD transmission duration fields such as indicating the duration of a transmission opportunity (TXOP). A duration field may include a duration used for an acknowledgement transmission. The trigger message may include one or more FD acknowledgment fields such as indicating an FD ACK transmission or a sequential ACK transmission, which may be predefined or predetermined. The trigger message may include one or more FD_RES appended fields that indicate whether a FD_RES message or an interference measurement report may be aggregated with a data transmission. If this field is set, the primary STA (STA1) may aggregate an interference report with a data transmission. The interference report may carry measurements made when the secondary STA (STA2) transmit an FD_RES message to the AP. For example a quantized value of P_rx or whether P_rx is larger than a threshold. The trigger message may include one or more header setting fields for the primary STA. A header setting field may carry the following information: bandwidth used for an upcoming transmission from the primary STA to the AP; MCS used for an upcoming transmission from the primary STA to the AP; precoding/beam used for an upcoming transmission from the primary STA to the AP; cyclic prefix used for an upcoming transmission from the primary STA to the AP; padding used for an upcoming transmission from the primary STA to the AP to align with a DL transmission from the AP to the secondary STA.

Figure 14:
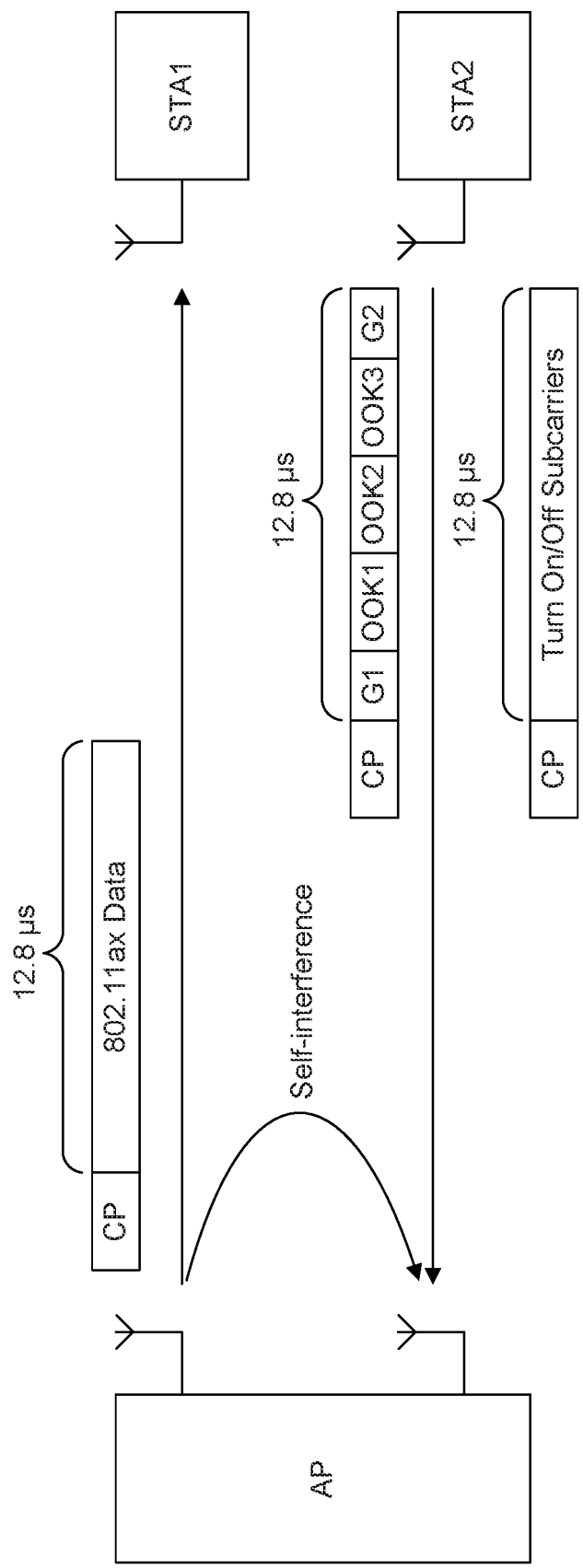
FIG. 14 is an example non-coherent scheme in the uplink.

An uplink waveform transmitted from a STA may be based on a non-coherent scheme if a full-duplex communications mode is enabled at the AP side. Before enabling a full-duplex mode, the AP may send a configuration signal to STA2 to switch its waveform to a non-coherent scheme. After STA2 is triggered, STA2 may transmit bits over a prescribed coherent scheme. For example, if an AP is in full-duplex communications in an asymmetric scenario as shown in FIG. 14, the non-coherent scheme in the uplink direction may be based on on-off keying (OOK), pulse-amplitude modulation (PAM), or frequency shift keying (FSK) to facilitate demodulation of STA2's signal under self-interference while keeping the transmitting OFDM waveform in the downlink direction.

To avoid channel estimation in the uplink, the information bits at STA2 may be encoded with Manchester-coding. In case of an OOK-based non-coherent scheme, the corresponding OFDM symbol duration (e.g., 12.8 ρs in FIG. 14) may include several OOK symbols. A group of OOK symbols may encode bit 1 and bit 0. The CP duration may not include any OOK symbols. For example, in FIG. 14, three coded OOK symbols with 4 ρs duration are placed within the useful duration of OFDM symbols. The data rate for STA2 may be increased by decreasing a duration of OOK symbols.

Subcarrier indices may be turned on and off based on Manchester-coding. For example, if the information bit is 1, a set of subcarriers may be activated. If the information bit is 0, another set of subcarriers may be turned on. These set of subcarriers may be chosen within the RUs used in the downlink direction. For example, it may be some of the RUs in OFDM symbol in the downlink direction. The receiver may compare the energy of the subcarriers in the sets to demodulate STA2's signal.

Figure 15:
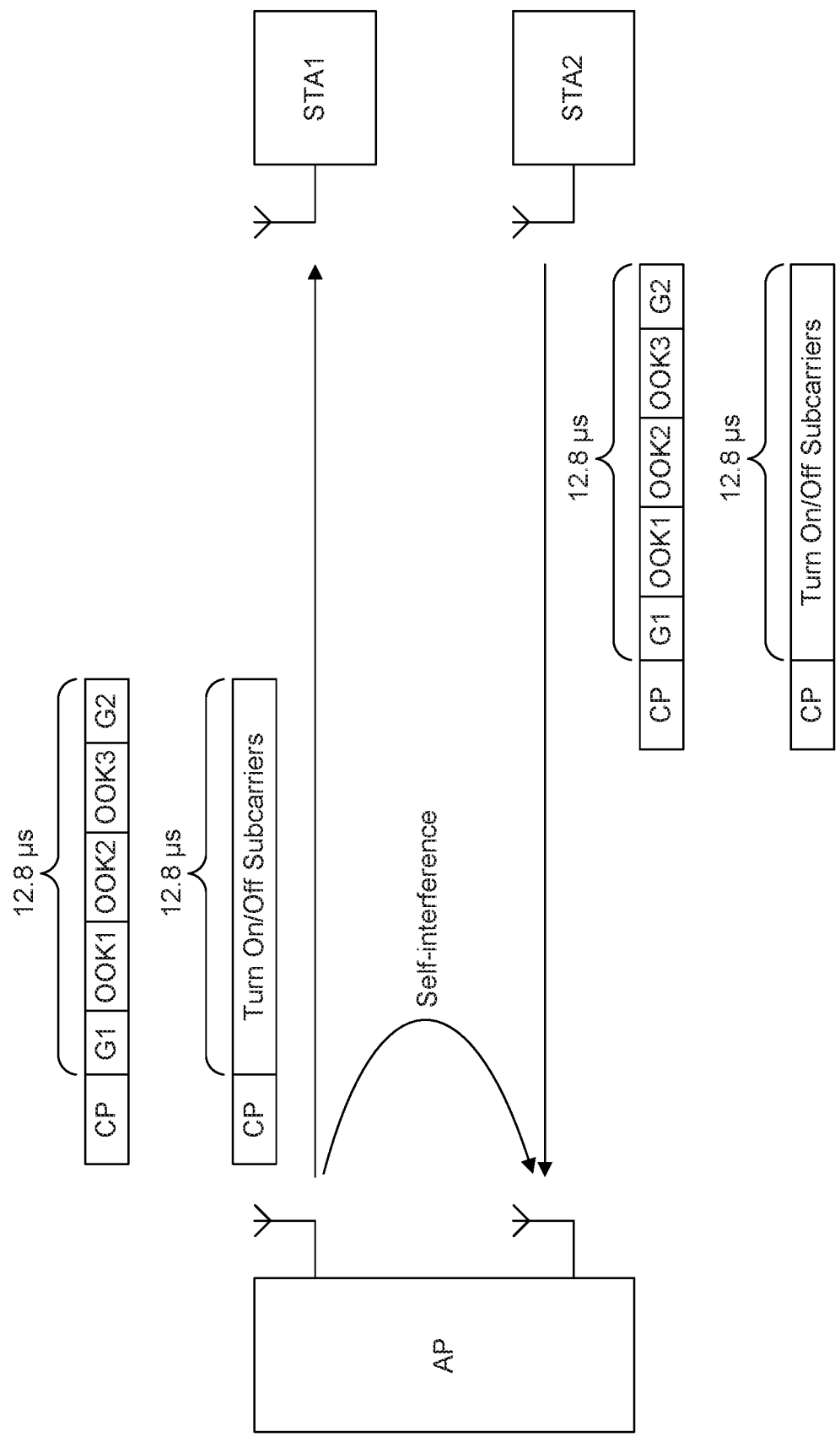
FIG. 15 is an example non-coherent scheme in both uplink and downlink.

In case of an asymmetric scenario, both uplink and downlink transmission may be based on non-coherent schemes. As shown in FIG. 15, both uplink and downlink transmission may use several OOK and/or FSK symbols by using some of the subcarriers. In this scenario, before entering full-duplex mode, the AP may communicate to both STA 1 and STA2 to set their transmission and reception modes to be non-coherent, respectively.

Figure 16:
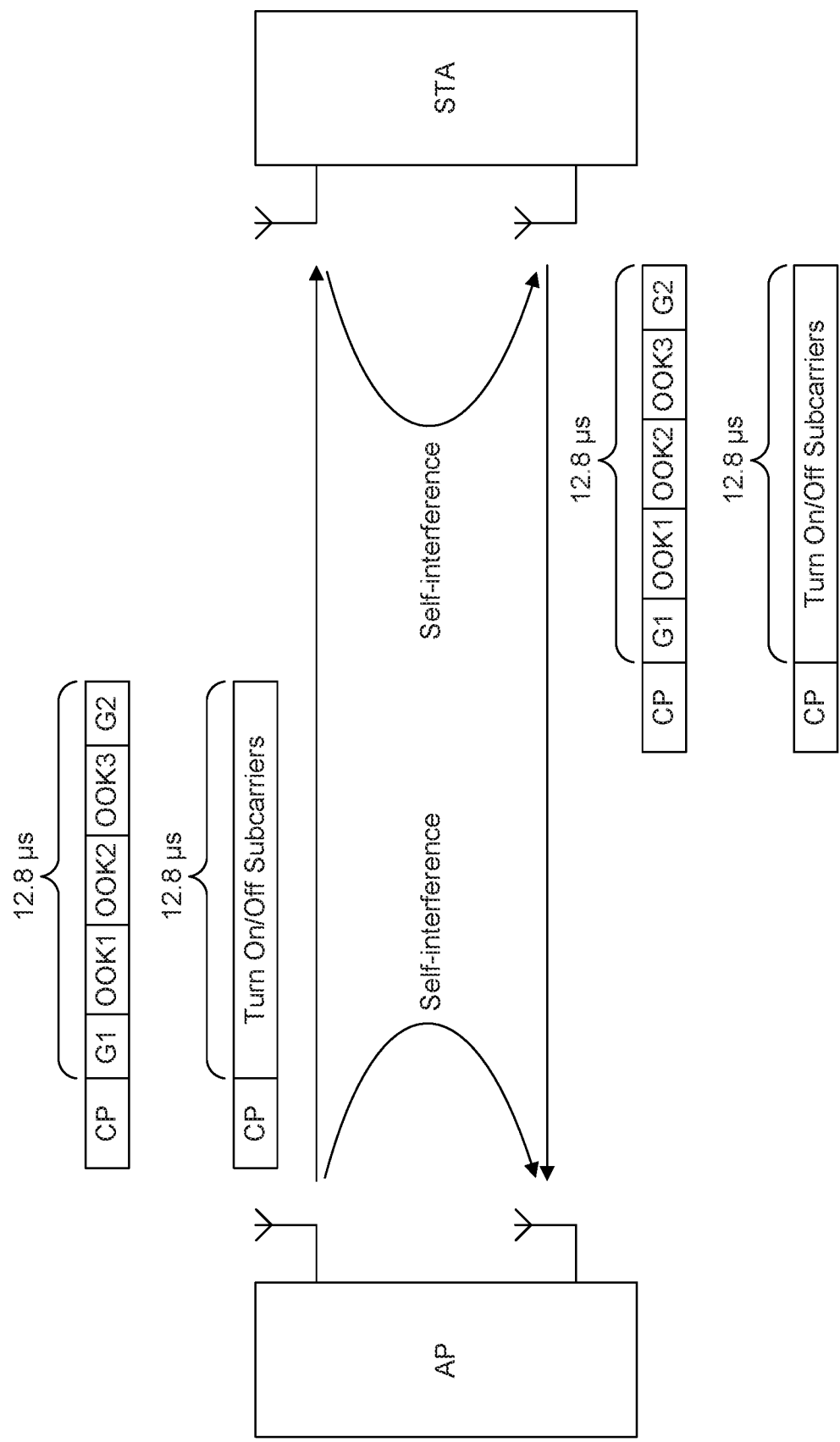
FIG. 16 is an example non-coherent scheme in both uplink and downlink.

Both uplink and downlink directions may employ aforementioned non-coherent schemes. For example, in case of a symmetric scenario as in FIG. 16, both AP and STA may use OOK and/or FSK symbols to facilitate their self-interference cancellation hardware.

Although the solutions described herein consider 802.11 specific protocols, it is understood that the solutions described herein are not restricted to this scenario and are applicable to other wireless systems as well.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for interference discovery for simultaneous transmission and reception (STR), implemented by a station (STA), the method comprising:
   receiving a STR request message from an access point (AP), wherein the STR request message includes an indication that the STA is a primary station;
   transmitting a first STR response message to the AP;
   monitoring a second STR response message transmitted from a second STA to the AP;
   determining a received power of the second STR response message transmitted from the second STA to the AP;
   receiving a first trigger message from the AP, wherein the first trigger message includes information to perform STR data transmission;
   transmitting data to the AP in response to the first trigger message; and
   transmitting interference information to the AP, wherein the interference information is based on the determined received power.

2. The method of claim 1, further comprising receiving a second trigger message from the AP.

3. The method of claim 2, wherein the second trigger message indicates sequential acknowledgement transmission or STR acknowledgement transmission.

4. The method of claim 3, further comprising receiving an acknowledgement message from the AP based on the second trigger message.

5. The method of claim 1, wherein the interference information is aggregated with the data transmitted to the AP.

6. The method of claim 1, wherein the first trigger message includes an indication that allows the interference information to be aggregated with the data transmission to the AP.

7. A station (STA) configured for simultaneous transmission and reception (STR), the STA comprising:
   a receiver;
   a transmitter; and
   a processor, wherein:
   the receiver is configured to receive a STR request message from an access point (AP), wherein the STR request message includes an indication that the STA is a primary station;
   the transmitter is configured to transmit a first STR response message to the AP;
   the processor and the receiver are configured to monitor a second STR response message transmitted from a second STA to the AP;
   the processor is further configured to determine a received power of the second STR response message transmitted from the second STA to the AP;
   the receiver is further configured to receive a first trigger message from the AP, wherein the first trigger message includes information to perform STR data transmission;
   the transmitter is further configured to transmit data to the AP in response to the first trigger message; and
   the transmitter is further configured to transmit interference information to the AP, wherein the interference information is based on the determined received power.

8. The STA of claim 7, wherein the receiver is further configured to receive a second trigger message from the AP.

9. The STA of claim 8, wherein the second trigger message indicates sequential acknowledgement transmission or STR acknowledgement transmission.

10. The STA of claim 9, wherein the receiver is further configured to receive an acknowledgement message from the AP based on the second trigger message.

11. The STA of claim 7, wherein the interference information is aggregated with the data transmitted to the AP.

12. The STA of claim 7, wherein the first trigger message includes an indication that allows the interference information to be aggregated with the data transmission to the AP.

13. A station (STA) configured for simultaneous transmission and reception (STR), the STA comprising:
   a receiver;
   a transmitter; and
   a processor, wherein:
   the receiver is configured to receive a STR request message from an access point (AP), wherein the STR request message includes an indication that the STA is a primary station;
   the processor and the receiver are configured to monitor a first STR response message transmitted from a second STA to the AP;
   the processor is further configured to determine a received power of the first STR response message transmitted from the second STA to the AP;
   the processor is further configured to determine whether the received power is greater than a threshold;
   the transmitter is configured to transmit a second STR response message to the AP;
   the transmitter is further configured to transmit a STR indication to the AP, wherein the STR indication is based on the determination of whether the received power is greater than a threshold;
   the receiver is further configured to receive a first trigger message from the AP, wherein the first trigger message includes STR transmission configuration information;
   the transmitter is further configured to transmit data to the AP; and
   the receiver is further configured to receive a second trigger message, wherein the second trigger message includes acknowledgement transmission configuration information.

14. The STA of claim 13, wherein the STR request message includes a time offset for a STR response message.

15. The STA of claim 14, wherein the transmitter is further configured to transmit the second STR response message based on the time offset.

16. The STA of claim 13, wherein the indication indicates clear for STR on a condition that the received power is less than a threshold and wherein the indication indicates deny for STR on a condition that the received power is greater than a threshold.

17. The STA of claim 13, wherein the STR indication is transmitted in the second STR response message.

18. The STA of claim 13, wherein the transmitter is further configured to transmit an acknowledgement message to the AP, wherein the acknowledgment message is transmitted based on the second trigger message.

* * * * *